(12) United States Patent
Murakami et al.

(10) Patent No.: US 8,326,160 B2
(45) Date of Patent: Dec. 4, 2012

(54) DISPERSION COMPENSATION DEVICE, OPTICAL RECEPTION DEVICE, METHOD FOR DISPERSION COMPENSATION, AND METHOD FOR OPTICAL RECEPTION

(75) Inventors: Makoto Murakami, Kawasaki (JP); Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 12/951,643

(22) Filed: Nov. 22, 2010

(65) Prior Publication Data

US 2011/0123191 A1    May 26, 2011

(30) Foreign Application Priority Data

Nov. 24, 2009  (JP) ................................. 2009-266681

(51) Int. Cl.
 *H04B 10/06* (2006.01)
 *H04B 10/00* (2006.01)
 *H04B 10/12* (2006.01)
 *H04J 14/02* (2006.01)

(52) U.S. Cl. .......... 398/209; 398/81; 398/135; 398/136; 398/137; 398/138; 398/139; 398/147; 398/148; 398/149; 398/150; 398/158; 398/159; 398/160; 398/161; 398/162; 398/202; 398/203; 398/204; 398/205; 398/206; 398/207; 398/208; 398/210; 398/211; 398/212; 398/213; 398/214

(58) Field of Classification Search ............ 398/81, 398/135–139, 147–150, 158–162, 202–214
See application file for complete search history.

(56) References Cited

U.S. PATENT DOCUMENTS 6,204,949 B1 * 3/2001 Ishikawa et al. .............. 398/159
6,266,170 B1 * 7/2001 Fee ................................ 398/147

FOREIGN PATENT DOCUMENTS

JP    2006-333312 A    12/2006
JP    2007-329558 A    12/2007

* cited by examiner

*Primary Examiner* — Kenneth N Vanderpuye
*Assistant Examiner* — Casey Kretzer
(74) *Attorney, Agent, or Firm* — Fujitsu Patent Center

(57) ABSTRACT

A dispersion compensation device includes: an optical branching unit to branch an optical signal to be received; a first dispersion compensator to perform dispersion compensation on one part of the optical signal branched by the optical branching unit with a variable compensation amount; a second dispersion compensator to perform dispersion compensation on another part of the optical signal branched by the optical branching unit; a monitoring unit to monitor the communication quality of an output optical signal of the second dispersion compensator; and a controlling unit to determine the direction of variation in chromatic dispersion of the optical signal based on the direction of variation in communication quality monitored by the monitoring unit and control the compensation amount of the first dispersion compensator based on the result of the determination.

12 Claims, 24 Drawing Sheets

DISPERSION COMPENSATION DEVICE, OPTICAL RECEPTION DEVICE, METHOD FOR DISPERSION COMPENSATION, AND METHOD FOR OPTICAL RECEPTION

CROSS-REFERENCE TO RELATED APPLICATIONS

This application is based upon and claims the benefit of priority from the prior Japanese Patent Application No. 2009-266681 filed on Nov. 24, 2009, the entire contents of which are incorporated herein by reference.

FIELD

The embodiments discussed herein are related to a dispersion compensation device that performs optical compensation on an optical signal, an optical reception device, a method for dispersion compensation, and a method for optical reception.

BACKGROUND

An optical fiber used as a signal transmission line in an optical transmission system has wave dispersion characteristics. The term "chromatic dispersion" is a phenomenon in which the transmission rate of light varies depending on the wavelength thereof and acts as a cause of distorting an optical signal. The longer the transmission distance, the more the chromatic dispersion increases. As a result, the distortion of a waveform increases. The optical receiver, which receives an optical signal, has a dispersion tolerance (dispersion proof characteristic). The dispersion tolerance of the optical receiver is specified by the residual amount of chromatic dispersion for satisfying a regular transmission penalty.

The farther the residual amount of chromatic dispersion is from the optimal value, the more limited the transmission distance of the optical transmission system is by the chromatic dispersion. The dispersion tolerance becomes smaller in inverse proportion to the square of the ratio of transmission rate (e.g., bit rate). On the reception side of an optical signal, a chromatic dispersion compensator (hereinafter, simply referred to as a "DC") may be provided having the inverse characteristic of the chromatic dispersion of a transmission line to compensate the chromatic dispersion caused in the transmission line.

In addition, the optical transmission system based on wavelength division multiplexing (WDM) realizes long distance transmission by performing collective compensation (waveform-distortion correction) on optical signals of the respective wavelengths (optical signals of the respective channels) included in a WDM signal using the DC. The examples of the DC include a fixed DC in which the compensated amount of chromatic dispersion is a fixed value and a tunable optical DC (hereinafter, simply referred to as a TODC) in which the compensation amount of chromatic dispersion is variable and externally controlled.

Conventional optical transmission systems predominantly use a fixed DC in which the amount of chromatic dispersion is fixed. The dispersion property of the fixed DC is designed to have the reverse characteristic of the chromatic dispersion of the transmission line. In this case, however, the complete reverse characteristic is not observed. The use of the fixed DC causes an error in dispersion compensation due to any of various factors, so that the long distance transmission may lead to insufficient compensation or over compensation.

In a high-bit rate signal transmission with a narrow dispersion tolerance of 40 Gbps or more, chromatic dispersion serves as a significant limiting factor. Thus, a conventional WDM transmission system at a high rate of 40 or more Gbps using the TODC in which a different compensation amount is set to each channel (wavelength) is described in for example, Japanese Laid-open Patent Publication No. 2007-329558.

A TODC may be replaced with the fixed DC or may be used in combination with the fixed DC. TODC suppresses the compensation error between channels (wavelengths). In addition, when a change in amount of chromatic dispersion generated by an optical signal in the transmission line occurs, the degradation of a transmission characteristic may be prevented by adjusting the compensation amount of chromatic dispersion to an optimal level. The change in amount of chromatic dispersion may be recognized by monitoring the number of errors or bit error rate (BER) of the optical signal.

SUMMARY

According to an aspect of the invention, a dispersion compensation device includes: an optical branching unit to branch an optical signal to be received; a first dispersion compensator to perform dispersion compensation on one part of the optical signal branched by the optical branching unit with a variable compensation amount; a second dispersion compensator to perform dispersion compensation on another part of the optical signal branched by the optical branching unit; a monitoring unit to monitor the communication quality of an output optical signal of the second dispersion compensator; and a controlling unit to determine the direction of variation in chromatic dispersion of the optical signal based on the direction of variation in communication quality monitored by the monitoring unit and control the compensation amount of the first dispersion compensator based on the result of the determination.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The aforementioned related technology has a problem in that whether the compensation amount of the chromatic dispersion by the TODC is excessive or poor with respect to the amount of chromatic dispersion of an optical signal when an increase in BER occurs from a state where the compensation amount of the chromatic dispersion by the TODC is the optimal compensation amount (i.e., the state where BER is the minimum) and shifts from the optimal compensation amount. In other words, the BER quadratically varies with the compensation amount of the chromatic dispersion by the TODC. An increase in BER occurs even if the compensation amount of the chromatic dispersion by the TODC shifts from the optimal compensation amount to either the incremental direction or the decremental direction.

Therefore, the change in compensation amount of the chromatic dispersion by the TODC from the optimal compensation amount can be detected based on the increases in BER. In this case, however, the direction of a change in compensation amount cannot be determined. In other words, it is difficult to determine whether the present compensation amount of the chromatic dispersion by the TODC is insufficient because of an increase in optimal compensation amount or the present compensation amount of the chromatic dispersion by the TODC is excessive because of a decrease in optimal compensation amount. That is, if the BER increases, there is no way to determine whether the compensation amount of the chromatic dispersion by the TODC should be increased or decreased to reduce the BER. Thus, it is difficult to quickly and appropriately control the compensation amount of the chromatic dispersion by the TODC.

In contrast, if the BER increases, the compensation amount of the chromatic dispersion by the TODC may be changed to a predetermined direction. As a result, if a further increase in BER is observed, then it may be determined that the control direction is opposite and the compensation amount of the chromatic dispersion by the TODC may be changed to the opposite direction. In this case, however, there is a problem in that a temporal increase in BER occurs when the control direction is the aforementioned first control direction, or a decrease in communication quality. In addition, there is another problem in that it takes time to lower the BER by changing the compensation amount to the opposite direction.

Compensation Amount of Chromatic Dispersion and Amount of Chromatic Dispersion

Hereafter, embodiments will be described in detail with reference to the attached drawings.

First Embodiment

Figure 1:
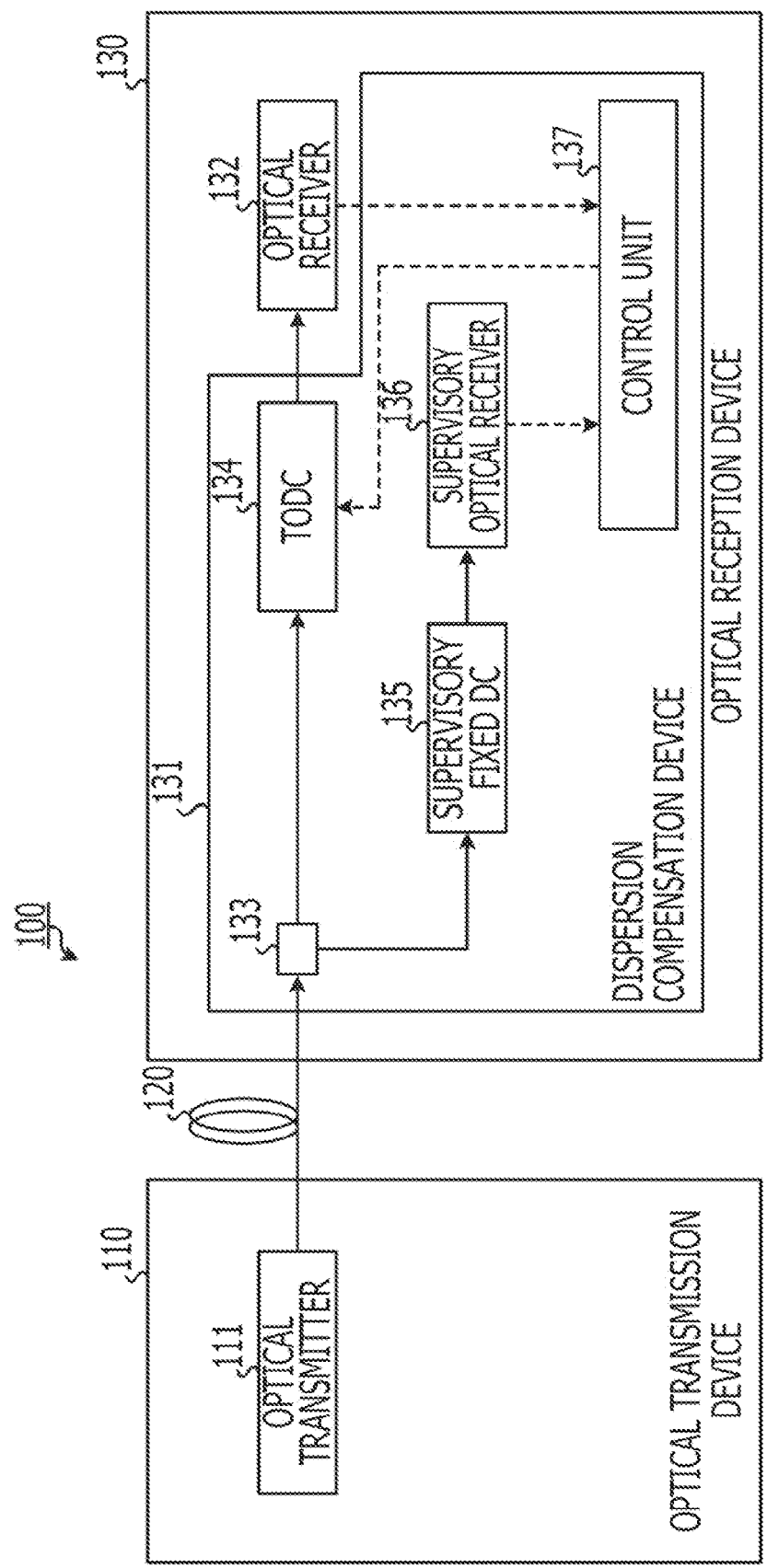
FIG. 1 is a diagram illustrating an example of the configuration of an optical transmission system according to a first embodiment.

FIG. 1 is a diagram illustrating an example of the configuration of an optical transmission system according to a first embodiment. In FIG. 1, solid line arrows represent optical signals, respectively. Dotted line arrows represent control signals, such as supervisory signals, respectively. It is noted that arrows in other figures are similar to those in FIG. 1.

As shown in FIG. 1, an optical transmission system 100 according to the first embodiment includes an optical transmission device 110, a transmission line 120, and an optical reception device 130. In addition, the optical transmission device 110 includes an optical transmitter 111.

The optical transmitter 111 converts an electrical signal output from a signal processing unit (not shown). The optical transmitter 111 transmits the converted optical signal to the optical reception device 130 through the transmission line 120. The transmission line 120 may be an optical fiber or the like. Chromatic dispersion occurs in the transmission line 120 when the optical signal is transmitted from the optical transmission device 110 to the reception device 130.

The optical reception device 130 includes a dispersion compensation device 131 and an optical receiver 132. The dispersion compensation device 131 compensates the chromatic dispersion of an optical signal transmitted from the optical transmission device 110. The optical receiver 132 receives the optical signal where the chromatic dispersion was compensated by the dispersion compensation device 131 and then outputs the received optical signal to a signal processing section (not shown).

In addition, the optical receiver 132 may monitor the communication quality of the optical signal output from the dispersion compensation device 131. For example, the optical receiver 132 calculates the BER of the optical signal as the information about the communication quality of the optical signal from the dispersion compensation device 131, or a communication quality index. The optical receiver 132 outputs the calculated BER to the dispersion compensation device 131.

The dispersion compensation device 131 includes an optical coupler 133, a TODC 134, a supervisory fixed DC 135, a supervisory optical receiver 136, and a control unit 137. The optical coupler 133 branches the optical signal output from the transmission line 120. Specifically, the optical coupler 133 branches the optical signal transmitted from the optical transmission device 110 through the transmission line 120 and then outputs the branched optical signals to the TODC 134 and the supervisory fixed DC 135, respectively.

The TODC 134 is a dispersion compensation device that performs dispersion compensation on the optical signal received by the optical receiver 132 with reference to the variable amount of compensation. Specifically, the TODC 134 performs dispersion compensation on a branched optical signal output from the coupler 133 and then transmits the dispersion-compensated optical signal to the optical receiver 132. The compensation amount of chromatic dispersion by the TODC 134 is controlled by the control unit 137.

The TODC 134 may be any of various tunable dispersion compensators including a VIPA type dispersion compensator using a virtually image phased array (VIPA), an etalon dispersion compensator using an etalon board, a fiber bragg grating (FBG) dispersion compensator, and a ring resonator dispersion compensator.

The supervisory fixed DC 135 is a supervisory compensator that performs dispersion compensation on the other optical signal, which is branched by the optical coupler 133, using an insufficient or excessive compensation amount with respect to the chromatic dispersion of the optical signal. Specifically, the supervisory fixed DC 135 performs dispersion compensation on the optical signal output from the optical coupler 133 and then outputs the dispersion-compensated optical signal to the supervisory optical receiver 136.

For example, the supervisory fixed DC 135 is a dispersion compensating fiber (DCF). An insufficient compensation amount with respect to the amount of chromatic dispersion of the optical signal refers to a compensation amount lower than the optimal compensation amount. An excessive compensation amount with respect to the amount of chromatic dispersion of the optical signal refers to a compensation amount higher than the optimal compensation amount. The optimal compensation amount refers to a compensation amount by which the amount of chromatic dispersion of the received optical signal is minimized (in other words, the minimum BER of the optical signal).

The compensation amount of the supervisory fixed DC 135 is set to be equal to or more than the optimal compensation amount. In consideration of a variation in amount of chromatic dispersion expected to be generated in the transmission line 120, the compensation amount of the supervisory fixed DC 135 is preferably a value with chromatic dispersion equal to, more, or less than the variation.

The supervisory optical receiver 136 monitors the communication quality of the optical signal (output optical signal) dispersion-compensated by the supervisory fixed DC 135. Specifically, the supervisory optical receiver 136 monitors the communication quality of an optical signal output from the supervisory fixed DC 135 by counting the number of errors in the optical signal as information that represents the communication quality of the optical signal, calculating BER from the counted number of the errors, or the like. In the present embodiment, the supervisory optical receiver 136 calculates the BER of the optical signal output from the supervisory fixed DC 135 and then outputs the calculated BER to the control unit 137.

The control unit 137 determines the direction of an increase or decrease in compensation amount of the chromatic dispersion to be applied to an optical signal on the basis of the direction of variation in communication quality monitored by the supervisory optical receiver 136. Specifically, the control unit 137 determines the direction of variation in compensation amount of a chromatic dispersion based on the direction of variation in BER from the supervisory optical receiver 136. The control unit 137 controls an increase or decrease in compensation amount of the TODC 134 based on the result of determining the direction of the variation. Specifically, the control unit 137 controls the compensation amount of the TODC 134 so that the BER of the optical signal received by the optical receiver 132 can be minimized and/or less than a threshold, e.g., a predetermined amount.

In addition, the control unit 137 may control the compensation amount of the TODC 134 based on the BER output from the optical receiver 132 but not the BER output from the supervisory optical receiver 136. The control unit 137 can be realized by a central processing unit (CPU), for example.

The monitoring of the communication quality of the optical signal by the optical receiver 132 and the supervisory optical receiver 136 may be performed constantly or periodically at certain time intervals. The optical receiver 132 and the supervisory optical receiver 136 may detect an error in the optical signal using an error-detecting code included in the optical signal and then calculate the frequency of error per bit of the optical signal to determine the BER.

Figure 2:
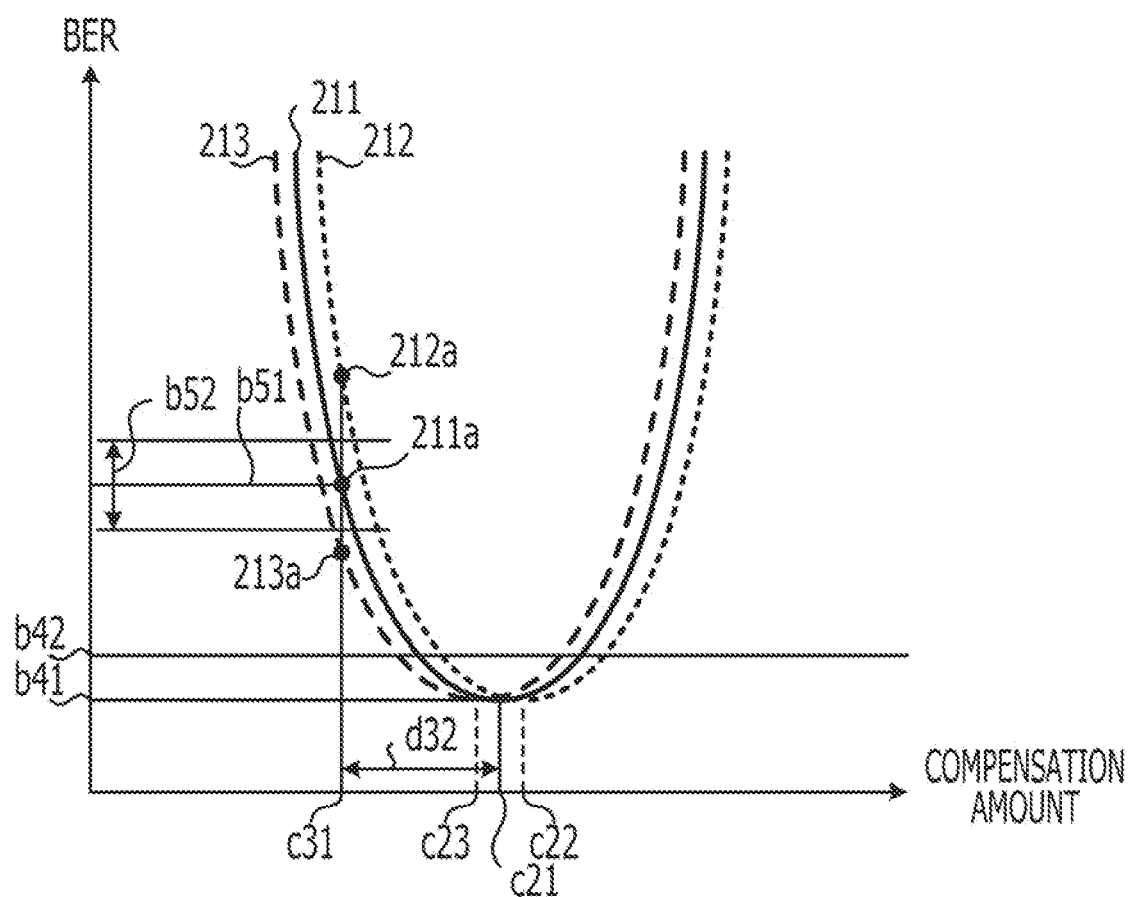
FIG. 2 is a graphic diagram illustrating an example of setting of the compensation amount of a supervisory fixed DC shown in FIG. 1.

FIG. 2 is a graphic diagram illustrating an example of setting of the compensation amount of the supervisory fixed DC shown in FIG. 1. In FIG. 2, the horizontal axis represents the compensation amount of chromatic dispersion performed on an optical signal by the TODC 134 or the supervisory fixed DC 135. In addition, the vertical axis represents the BER (or transmission penalty) of an optical signal received by the optical receiver 132 or the supervisory optical receiver 136.

The characteristic curve 211 represents a change in BER of the optical signal with respect to the compensation amount of chromatic dispersion. As represented by the characteristic curve 211, the BER of the optical signal quadratically varies with the compensation amount of the chromatic dispersion. The optimal compensation amount c21 is the compensation amount of chromatic dispersion at which the BER is the minimum on the characteristic curve 211. The minimum value b41 corresponds to the value of BER when the compensation amount of chromatic dispersion reaches the optimal compensation amount c21.

In FIG. 1, if there is an increase in amount of chromatic dispersion of an optical signal input from the transmission line 120 into the dispersion compensation device 131, then the characteristic curve 211 is changed into a characteristic curve 212 as shown in FIG. 2. In this case, the optimal compensation amount c21 at which the BER is the minimum value b41 shifts as represented by a compensation amount c22. On the other hand, if there is a decrease in the amount of chromatic dispersion of the optical signal input into the dispersion compensator 121, then the characteristic curve 211 is changed into a characteristic curve 213. In this case, the optimal compensation amount c21 at which the BER is the minimum value b41 shifts as represented by a compensation amount c23.

Therefore, the control unit 137 adjusts the compensation amount of the TODC 134 to the optimal compensation amount c21 so that the BER of the optical signal received by the optical receiver 132 can be the minimum value b41. In addition, the control unit 137 may control the compensation amount of the TOD 134 so that the BER of the optical signal received by the optical receiver 132 is equal to or less than a reference value b42. The reference value b42 may be set as a maximum permissible value of the BER of the optical signal received from the optical receiver 132.

As shown in FIG. 2, for example, the compensation amount c31 of the supervisory fixed DC 135 is set to a compensation amount different from (e.g., insufficient to) the optimal compensation amount c21. Specifically, the compensation amount c31 of the supervisory fixed DC 135 c31 is set so that the distance d32 between the compensation amount c31 and the minimum compensation amount c21 is sufficient (for example, the BER values at these compensation amounts are different from each other in different orders of magnitude). Therefore, even if the amount of chromatic dispersion of the optical signal input from the transmission line 120 to the dispersion compensation device 131 varies with time or the like (see the characteristic curves 212 and 213), the compensation amount c31 of the supervisory fixed DC 135 can substantially always be smaller than the optimal compensation amount c21.

If the amount of chromatic dispersion of the optical signal input to the dispersion compensation device 131 increases (see the characteristic curve 212), then the BER of the optical signal received by the supervisory optical receiver 136 increases (from point 211a to point 212a). On the other hand, if the amount of chromatic dispersion of the input optical signal decreases (see the characteristic curve 213), then the BER of the optical signal received by the supervisory optical receiver 136 decreases (from point 211a to point 213a).

Thus, the compensation amount c31 of the supervisory fixed DC 135 is set to a compensation amount sufficiently smaller than the optimal compensation amount c21. Thus, the BER of the optical signal received from the supervisory optical receiver 136 varies within a range without passing through the minimum point. Therefore, the direction of variation in BER of the optical signal received by the supervisory optical receiver 136 varies depending on the direction of variation in chromatic dispersion of the optical signal input to the dispersion compensator 131.

In view of the foregoing, the control unit 137 can determine the direction of variation in chromatic dispersion of the optical signal based on the direction of variation in BER from the supervisory optical receiver 136. Thus, the compensation amount of the TODC 134 can be adjusted in an appropriate direction. For example, the control unit 137 increases the compensation amount of the TODC 134 when an increase in BER from the supervisory optical receiver 136 occurs. In view of the foregoing, the BER of the optical signal received by the optical receiver 132 can be adjusted to be near the minimum value b41.

Although not shown in the figure, the compensation amount c31 of the supervisory fixed DC 135 may be set to the compensation amount in excess to the optimal compensation amount c21. In this case, the direction of variation in optical signal received by the supervisory optical receiver 136 becomes reversed, as compared to that described above, depending on the direction of variation in chromatic dispersion of the optical signal input to the dispersion compensation device 131. In this case, the control unit 137 may decrease that the compensation amount of the TODC 134 when the BER output from the supervisory optical receiver 136 increases. If a decrease in BER of the optical signal output from the supervisory optical receiver 136 occurs, then the compensation amount of the TODC 134 may be controlled to increase.

In addition, for example the control unit 137 changes the compensation amount of the TODC 134 as much as a specified and/or predetermined unit amount in the controlled direction based on the direction of variation in the BER. In addition, the control unit 137 may calculate the variation in dispersion of the optical signal input to the dispersion compensation device 131 based on the BER output from the supervisory optical receiver 136. In this case, the control section 137 causes a change in compensation amount of the TODC 134 for the amount depending on the calculated compensation amount of the TODC 134.

In addition, when the control unit 137 controls the compensation amount of the TODC 134 so that the BER is minimized (or so that the BER is not more than the reference value b42), the control unit 137 may allow a storage unit (not shown) to store the BER b51 output from the supervisory optical receiver 136. The control unit 137 may control the amount of compensation of the TODC 134 when the BER from the supervisory optical receiver 136 changes from the reference range b52 centered on the stored BER b51, for example. Consequently, a small or minute variation in BER, which does not affect communication, may be disregarded and the control of the TODC 134 may be stabilized.

Figure 3:
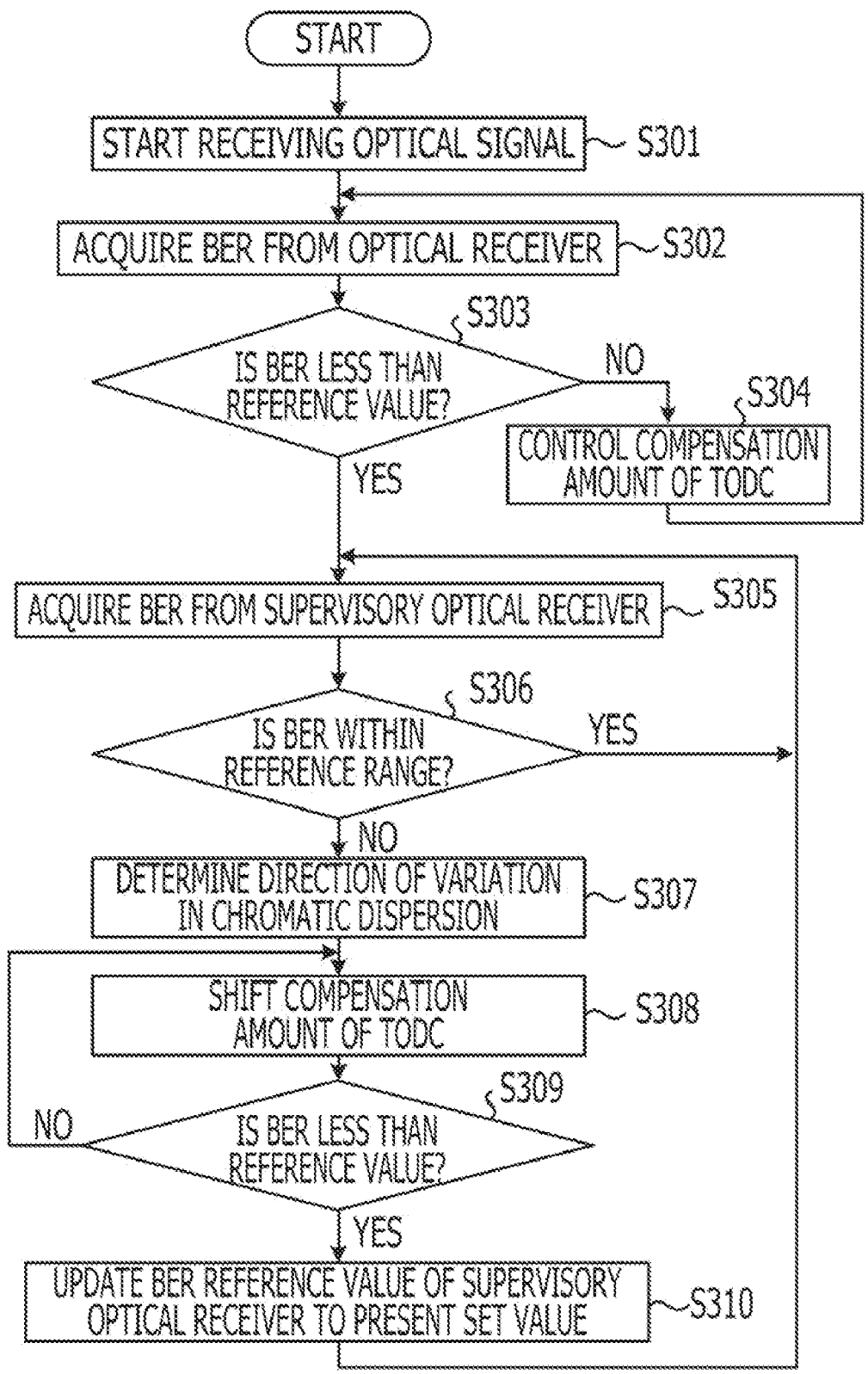
FIG. 3 is a flow chart representing an example of the operation of the control unit shown in FIG. 1.

FIG. 3 is a flow chart representing an example of the operation of the control unit 137 shown in FIG. 1. Steps S301 to S304 shown in FIG. 3 are provided for dispersion compensation control to be performed at the time of starting the dispersion compensation device 131. First, the control unit 137 starts the dispersion compensation device 131 and then starts the reception of an optical signal transmitted from the optical transmission device 110 through the transmission line 120 (step S301). Next, the control unit 137 acquires the BER output from the optical receiver 132 (step S302).

Then, the control unit 137 determines whether the BER acquired by step S302 is less than the reference value b42 (see FIG. 2) (step S303). Here, if the BER is not less than the reference value b42 (step S303: No), then the control unit 137 controls the compensation amount of the TODC 134 (step S304) and then returns to step S302 to continue the process. On the other hand, when the BER is less than the reference value b42 (Step S303: Yes), control unit 137 proceeds to step S305. Furthermore, the compensation amount of the TODC 134 may be controlled so that the BER is minimized.

Thus, in steps S301 to S304, the dispersion compensation control is performed based on the BER from the optical receiver 132. For example, in step S304, the control unit 137 determines the control direction of the compensation amount of the TODC 134 according to whether the BER from the optical receiver 132 as a result of the control of the compensation amount of the TODC 134 at step S304 of the previous loop, the previous series of the same steps.

Alternatively, another control method may be performed as described above instead of determining whether the BER acquired from the optical receiver 132 is less than the reference value in steps S303 and S304. In other words, in steps S303 and S304, this control method controls the TODC 134 so that the BER acquired from the optical receiver 132 is the reference value in steps S303 and S304. The control of the TODC 134 based on the BER acquired from the optical receiver 132 may be performed independent of the control based on the BER of the supervisory optical receiver corresponding to the following steps S305 to S308. The control based on the BER of the supervisory optical receiver is performed following the operation of starting up the dispersion compensation device 131.

The operation process of the control unit will be further described as follows with reference to FIG. 3. Steps S305 to S308 are provided for dispersion-compensation control after that the BER from the optical receiver 132 is adjusted to the reference value b42 or less in step S301 to S304. Here, it is assumed that the relationship between the compensation amount and the BER is represented by the characteristic curve 211 shown in FIG. 2 by controlling the TODC 134 as described above. The control unit 137 acquires the BER b51 output from the supervisory optical receiver 136 (see FIG. 2) (step S305).

Next, the control unit 137 determines whether the BER acquired by step S305 is in the reference range b52 (see FIG. 2) (step S306).

In step S306, the BER acquired from the supervisory optical receiver 136 is in the reference range b52 (step S306: Yes), the process returns to step S305 and then performs a procedure for acquiring BER b51 output from the supervisory optical receiver 136 is performed. For example, it corresponds to a case where the acquired BER corresponds to the characteristic curve 211 shown in FIG. 2.

Furthermore, when the acquired BER is in the reference range b52, the procedure for acquiring the BER output from the supervisory optical receiver 136 may be performed after the passage of a certain time. The aforementioned time is determined in consideration of a change in dispersion characteristic over time. Then, the procedure of step S305 is performed after the time passes. As a result, the likelihood of an undesirable amount of control TODC 134 may be reduced and the processing load of the control unit 137 may be reduced.

On the other hand, if the BER is out of the reference range b52 (step S306: No), then the direction of variation in chromatic dispersion of the optical signal is determined based on the direction of variation in the acquired BER (step S307). The term "direction of variation in BER" refers to a direction of an increase or reduction in BER acquired at present, for example, as compared with the BER (initial BER value) obtained by the procedure of step S305 performed at the first time (or previous time).

Furthermore, the direction of variation in BER and the direction of variation in chromatic dispersion of the optical signal are determined on the basis of whether the dispersion compensation amount of the supervisory fixed DC 135 is excessive compensation or insufficient compensation. Specifically, as shown in FIG. 2, if the compensation amount c31, which is an insufficient dispersion compensation amount when compared with the optimal dispersion compensation amount c21, is used for the supervisory fixed DC 135, the increase in BER measured via the supervisory fixed DC 135 is equivalent to the increase in amount of chromatic dispersion. Thus, it is shown that the chromatic dispersion characteristic of the transmission varies in the direction of increase in amount of chromatic dispersion. Therefore, in order to reach the optimal dispersion compensation amount, the dispersion compensation amount should be reduced.

The reduction in BER measured via the supervisory fixed DC 135 is equivalent to the reduction in amount of chromatic dispersion. Thus, it is shown that the chromatic dispersion characteristic of the transmission varies in the direction of decrease in amount of chromatic dispersion. Therefore, in order to reach the optimal dispersion compensation amount, the dispersion compensation amount should be increased. If an excessive dispersion compensation amount when compared with the optimal dispersion compensation amount c21 is used for the supervisory fixed DC 135, the increase in BER measured via the supervisory fixed DC 135 supports the reduction in amount of chromatic dispersion. Thus, it is shown that the chromatic dispersion characteristic of the transmission varies in the direction of decrease in amount of chromatic dispersion. Therefore, in order to reach the optimal dispersion compensation amount, the dispersion compensation amount should be increased.

The decrease in BER measured via the supervisory fixed DC 135 is equivalent to the increase in amount of chromatic dispersion. Thus, it is shown that the chromatic dispersion characteristic of the transmission varies in the direction of increase in amount of chromatic dispersion. Therefore, in order to reach the optimal dispersion compensation amount, the dispersion compensation amount should be reduced.

Referring back to FIG. 3, the control operation of the control unit will be further described. The compensation amount of the TODC 134 may be changed as much as a unit amount in the direction corresponding to the direction of variation in chromatic dispersion of the optical signal determined in step S307 (step S308). Next, the control unit 137 determines whether the BER is less than the reference value b42 (see FIG. 2) (step S309). Here, if the BER is not less than the reference value b42 (step S309: NO), then the process returns to step S308 and then makes progress. On the other hand, if the BER is less than the reference value b42 (step S309: Yes), then the control unit 137 updates the BER reference value of the supervisory optical receiver 136 to the present set value (step S310). Subsequently, the process proceeds to step S305.

Repeating steps S305 to S310, even if the amount of chromatic dispersion of the optical signal input to the dispersion compensation device 131 varies with time, the BER of the optical signal received by the optical receiver 132 may be controlled within the basic range b52.

Figure 4:
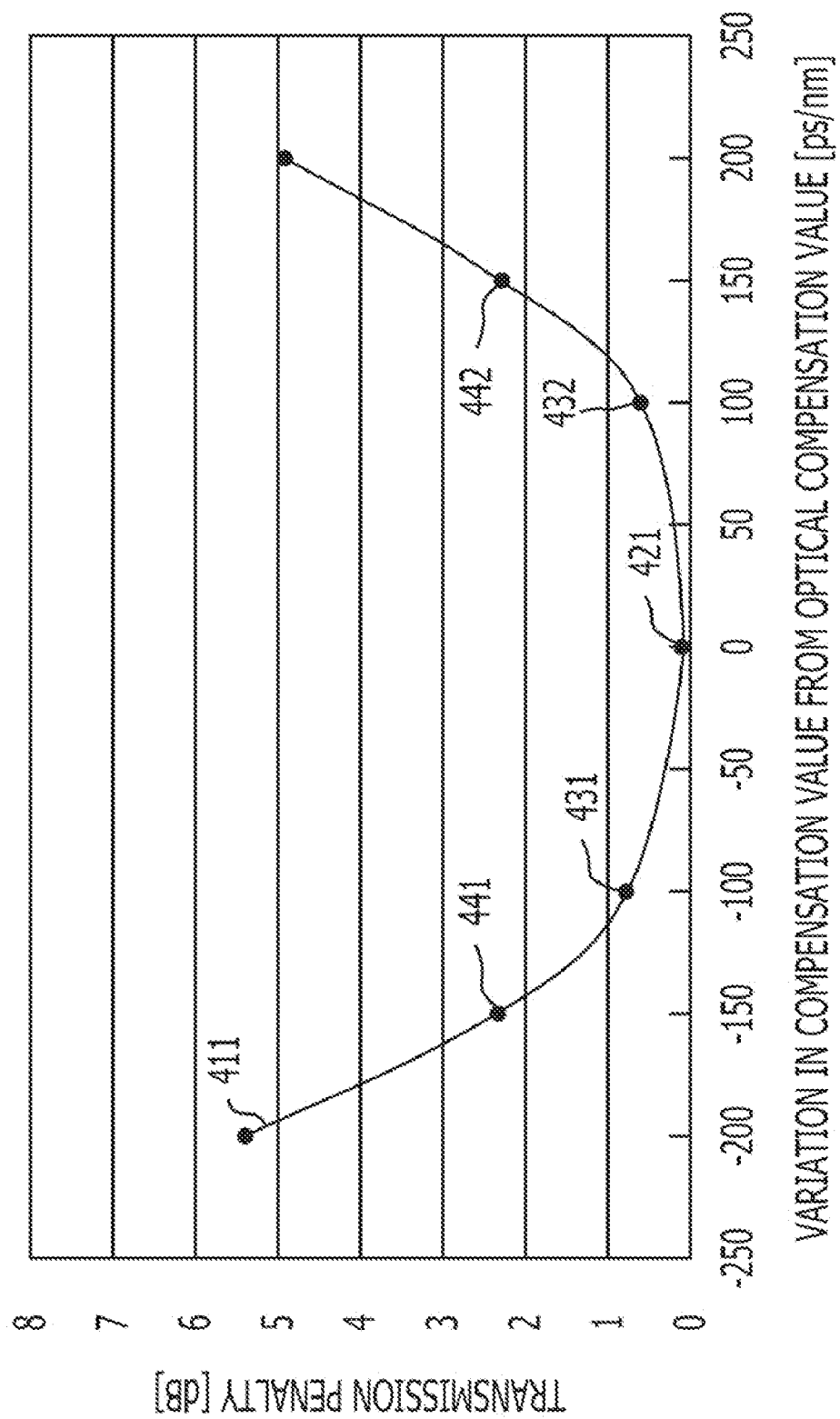
FIG. 4 is a graphic diagram illustrating an example of the actual measurement values of transmission penalty to the variation of compensation value from the optimal compensation amount.

FIG. 4 is a graphic diagram illustrating an example of the actual measurement values of transmission penalty to the variation of compensation value from the optimal compensation amount. The horizontal axis of FIG. 4 represents the variation [ps/nm] in compensation amount of chromatic dispersion, which is performed on an optical signal by the TODC 134 or the supervisory fixed DC 135, from the maximum compensation amount c21 (see FIG. 2). The vertical axis represents the transmission penalty [dB] of the optical signal received by the optical receiver 132 or the supervisory optical receiver 136.

A characteristic curve 411 represents the actual measurement value of the transmission penalty in the 40-Gbps optical signal with respect to the variation in compensation amount from the optimal compensation amount c21. As represented by the characteristic curve 411, if the variation in compensation amount of the chromatic dispersion performed on the optical signal is changed to zero (0) from the optimal compensation amount c21, the transmission penalty is the minimum. For example, when the compensation amount of the chromatic dispersion is set to the optimal compensation amount c21, in FIG. 4, the actual measurement value of the transmission penalty corresponds to the point 421 on the characteristic curve 411.

Furthermore, if the compensation amount of the chromatic dispersion shifts to plus or minus 100 [ps/nm], for example, it corresponds to point 431 or 432 on the characteristic curve 411. If the compensation amount of the chromatic dispersion shifts to plus or minus 150 [ps/nm], for example, it corresponds to point 441 or 442 on the characteristic curve 411. Furthermore, as is evident from the characteristic curve 411, the transmission penalty varies extensively with an increase or decrease in variation when the shift from the optimal compensation amount c21 is about plus or minus 150 [ps/nm].

Therefore, the compensation amount c31 of the supervisory fixed DC 135 (see FIG. 2) may be set to minus 150 [ps/nm] from the optimal residual amount of chromatic dispersion (optimal compensation amount c21). Thus, a steep variation in BER output from the supervisory optical receiver 136 can be obtained with respect to the variation in amount of chromatic dispersion of the optical signal input to the dispersion compensation device 131. For this reason, the control unit 137 can quickly detect a change in amount of chromatic dispersion of the optical signal input of the dispersion compensation device 131 with a high degree of accuracy in an effective manner.

Thus, the dispersion compensation device 131 of the first embodiment employs the supervisory optical receiver 136 to monitor the communication quality of the optical signal subjected to dispersion compensation with the excessive or insufficient compensation amount compared with the optimal amount of dispersion compensation by the supervisory fixed DC 135. Then, the supervisory optical receiver 136 can determine whether the communication quality of the optical signal is deteriorated or improved, for example, whether the chromatic dispersion is increased or decreased depending on the increase or decrease in the BER.

Therefore, the control unit 137 can appropriately determine the variation in chromatic dispersion of the optical signal based on the variation in communication quality index monitored by the supervisory optical receiver 136. Therefore, when the chromatic dispersion characteristic of the optical transmission line varies, the control unit 137 can promptly control the compensation amount of the TODC 134 in an appropriate direction depending on the direction of variation in chromatic dispersion. That is, the control unit 137 may prevent the communication quality from being deteriorated by changing the compensation amount to a wrong direction and shortens the time required for deterioration of the communication quality.

In addition, by monitoring the communication quality of the optical signal subjected to dispersion compensation with the excessive or insufficient compensation amount compared with the optimal amount of dispersion compression, a steep variation in the monitoring communication quality can be obtained with respect to the variation in amount of chromatic dispersion of the input optical signal. Therefore, compared with the conventional configuration for observing the communication quality of the optical signal subjected to dispersion compensation near the optical compensation amount c21, a variation in amount of chromatic dispersion of an optical signal can be more quickly detected in a precise manner. Therefore, the compensation amount of the TODC 134 can be quickly controlled with precision according to the example embodiment described above.

In addition, the optical signal received by the optical receiver 132 is branched by the optical coupler 133 and the branched optical signal is then dispersion-compensated by the supervisory fixed DC 135. Therefore, even if the supervisory fixed DC 135 performs dispersion compensation with insufficient or excessive compensation amount compared with the optimal dispersion compensation amount, an increase in amount of chromatic dispersion of the optical signal received by the optical receiver 132 does not occur. Therefore, there is no need of increasing the compensation amount of the TODC 134, so that an increase in size of the device and an increase in production cost thereof can be prevented.

Alternatively, the supervisory fixed DC 135 is arranged so that it can perform dispersion compensation on the optical signal received by the optical receiver 132 before branching the optical signal. For example, the supervisory fixed DC 135 may be arranged upstream of the optical coupler 133. In this case, the compensation amount of the TODC 134 may be appropriately selected based on the amount of chromatic dispersion of the optical signal received by the optical receiver 132.

In step S306 of FIG. 3, furthermore, if the BER of the supervisory optical receiver 136 is not within the reference range b52 (step S306: NO), then the BER output from the optical receiver 132 may be confirmed whether it is increased. If the BER output from the optical receiver 132 does not increase, then the process returns to step S305 to keep on processing. If the BER output from the optical receiver 132 increases, then the process proceeds to step S307. In this case, even though the speed of detecting a variation in amount of chromatic dispersion of an optical signal becomes slow, an erroneous detection of a variation in amount of chromatic dispersion of the optical signal is avoidable.

Second Embodiment

Figure 5:
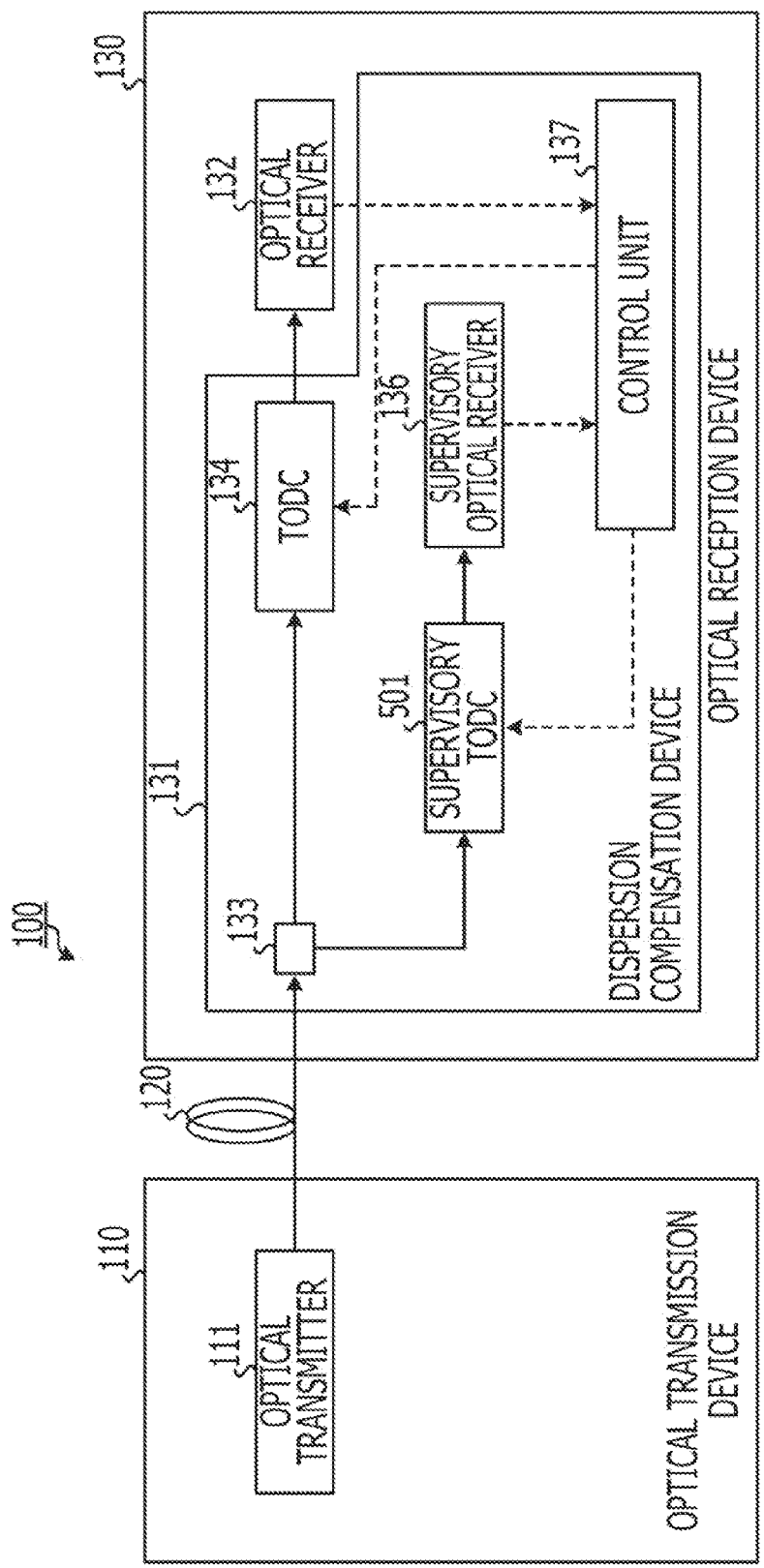
FIG. 5 is a block diagram illustrating the functional configuration of an optical transmission system according to a second embodiment.

FIG. 5 is a block diagram illustrating the functional configuration of an optical transmission system according to a second embodiment. In FIG. 5, components already described with reference to FIG. 1 are denoted by the same reference numerals, and thus detailed description thereof will be hereinafter omitted.

As shown in FIG. 5, the dispersion compensation device 131 of the second embodiment includes a supervisory TODC 501 instead of the supervisory fixed DC 135 (see FIG. 1) of the first embodiment. Thus, the compensation amount of a supervisory compensator can be changed. An optical coupler 133 branches an optical signal and the branched optical signals can be output to a TODC 134 and a supervisory TODC 501, respectively.

The supervisory TODC 501 is a supervisory compensator that performs dispersion compensation on the optical signal, which is branched by the optical coupler 133, using an insufficient or excessive compensation amount with respect to the chromatic dispersion of the optical signal. Specifically, the supervisory TODC 501 performs dispersion compensation on the optical signal output from the optical coupler 133 and then outputs the dispersion-compensated optical signal to a supervisory optical receiver 136. The compensation amount of chromatic dispersion by the supervisory TODC 501 is controlled by a control unit 137.

Figure 6:
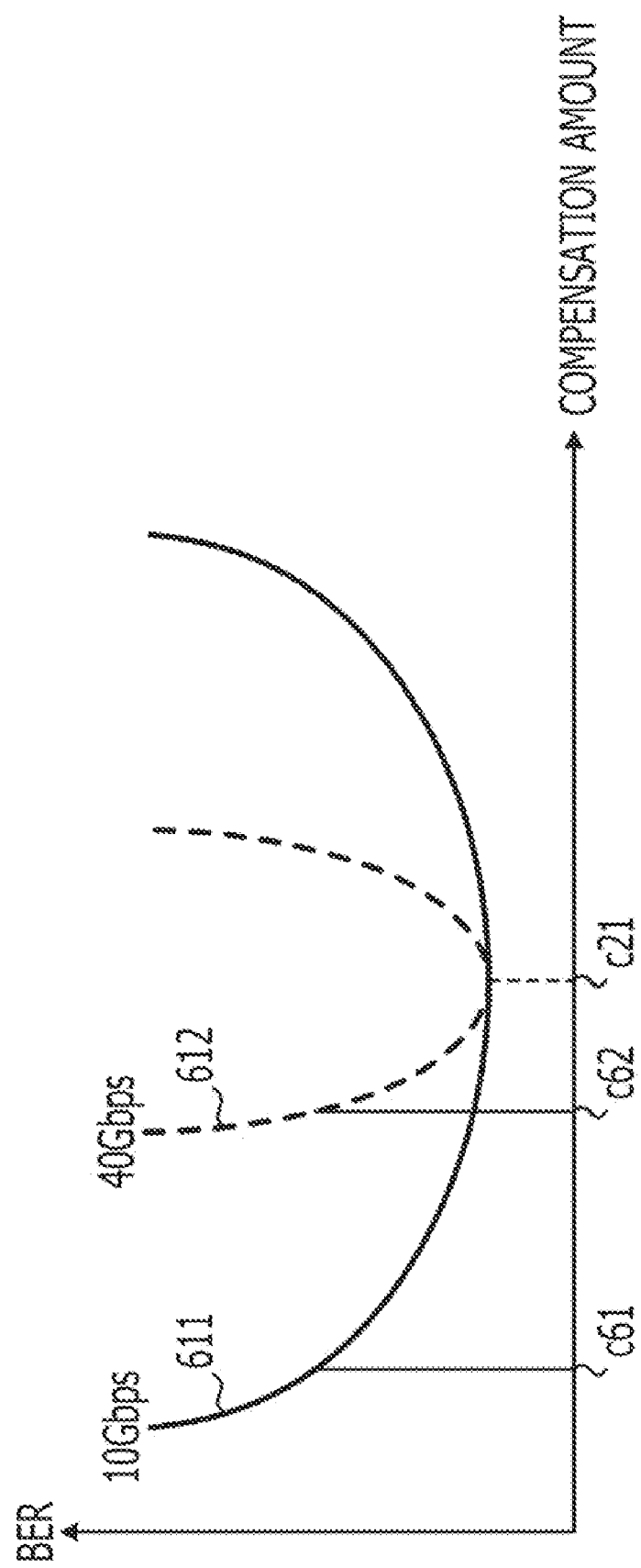
FIG. 6 is a graphic diagram illustrating the relationship between the compensation amount and the BER of the optical signal for different bit rates.

FIG. 6 is a graphic diagram illustrating the relationship between the compensation amount and BER of an optical signal for different bit rates. In FIG. 6, the horizontal axis and the vertical axis are the same as those of the graph shown in FIG. 2. A characteristic curve 611 (solid line) illustrates a variation in BER of an optical signal with a bit rate of 10 [Gbps]. A characteristic curve 612 (dashed line) represents a change in BER of an optical signal with respect to the compensation amount of chromatic dispersion when the optical signal has a bit rate of 40 [Gbs].

As represented by the characteristic curves 611 and 612, a steep variation in BER of the optical signal with the compensation amount of chromatic dispersion depends on the bit rate of the optical signal. Thus, an appropriate compensation amount of a supervisory compensator (here, the supervisory TODC 501) for dispersion compensation of an optical signal received by the supervisory optical receiver 136 may be different depending on the bit rate of the optical signal.

For example, it is considered that the control unit 137 adjusts the amount of the supervisory TODC 501 to compensation amount c61 under the condition of receiving an optical signal with a bit rate of 10 [Gbps]. In this case, subsequently, the bit rate of the optical signal is changed to 40 [Gbps] and the characteristic curve is then changed from the curve 611 to the curve 612.

In this instance, for example, the control unit 137 may adjust the compensation amount of the supervisory TODC 501 to compensation amount c62. Here, the optimal compensation amount c21 is closer to the compensation amount c62 than to the compensation amount c61. Thus, a significant increase in BER of the optical signal received from the supervisory optical receiver 136 can be avoided (here, almost the same degree as that of 40 [Gbps]), so that the supervisory optical receiver 136 can continuously monitor the BER of the optical signal in a stable manner. In other words, the control unit 137 adjusts the compensation amount of the supervisory TODC 501 to an appropriate compensation amount depending on the bit rate of the optical signal under monitoring according to the second embodiment.

In addition, for example, if the dispersion compensation device 131 continuously performs dispersion compensation control, the distance d32 between the compensation amount c31 and the optimal compensation amount c21 shown in FIG. 2 varies. Even in this case, the distance d32 can be kept constant by controlling the compensation amount of the supervisory TODC 501. Therefore, a variation in distance d32 can be reduced. Such a configuration can avoid a false operation due to an increase in compensation amount c31 of the supervisory TODC 501 more than the optimal compensation amount c21 and also avoid a significant increase in BER monitored by the supervisory optical receiver 136 due to an increased distance d32.

Figure 7:
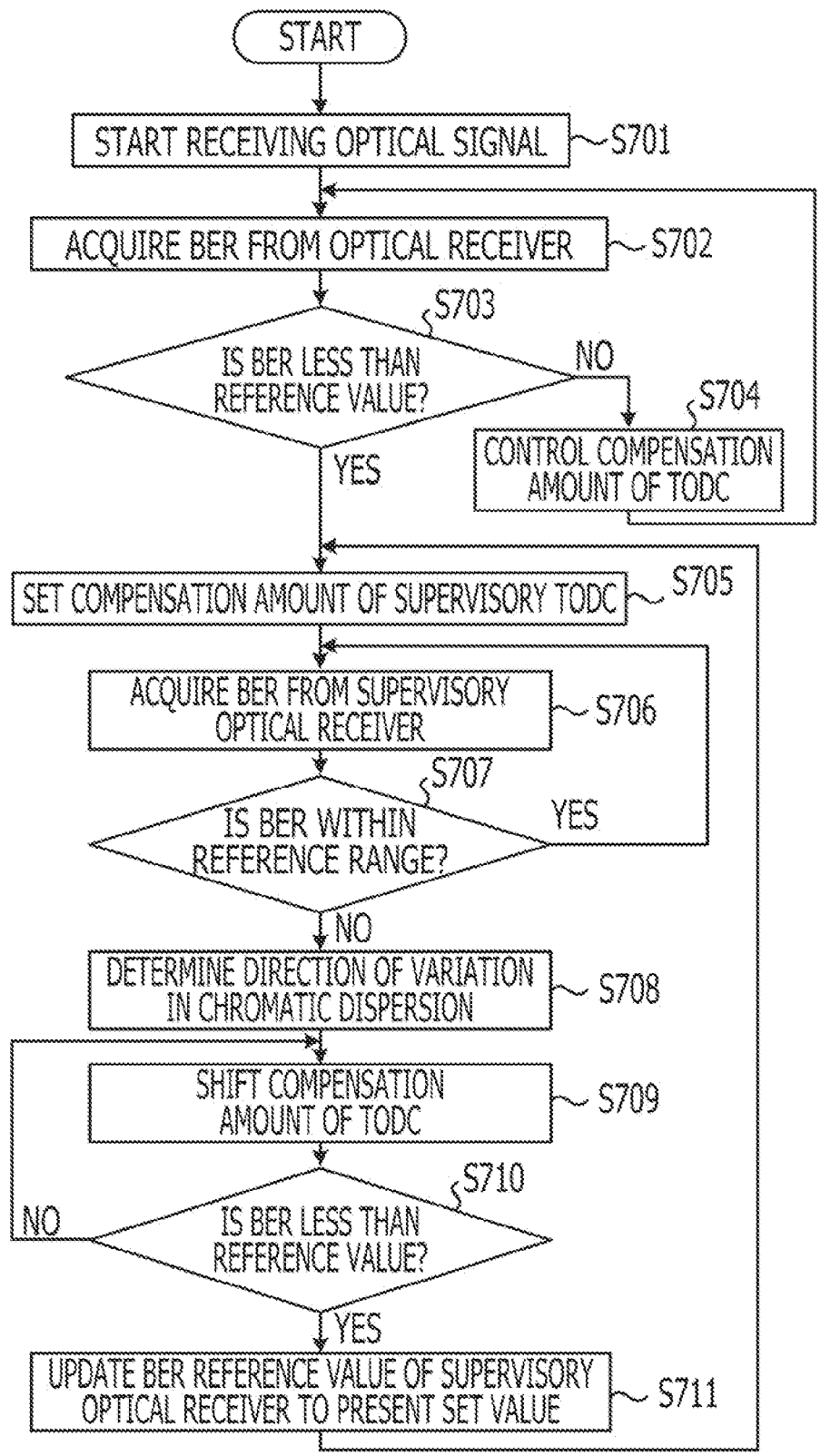
FIG. 7 is a flow chart illustrating an example of the operation of a control unit illustrated in FIG. 5.

FIG. 7 is a flow chart illustrating an exemplary operation of the control unit illustrated in FIG. 5. Steps S701 to S704 shown in FIG. 7 are the same as the steps S301 to S304 shown in FIG. 3, so that the descriptions thereof will be omitted. If the BER is less than the reference value b42 (see FIG. 2) in step S703 (step 703: YES), then the control unit 137 sets the compensation amount c31 (see FIG. 2) of the supervisory TODC 501 (step S705).

For example, in the range of compensation amount smaller than the optimal compensation amount c21, the control unit 137 sets the compensation amount c31 of the supervisory TODC 501 so that the BER of an optical signal output from the supervisory optical receiver 136 can be adjusted to a previously defined BER b51. Steps S706 to S711 shown in FIG. 7 are the same as the steps S305 to S310 shown in FIG. 3, so that the descriptions thereof will be omitted.

As described above, the dispersion compensation device 131 of the second embodiment includes the supervisory TODC 501 as a supervisory compensator for dispersion-compensating an optical signal received by the supervisory optical receiver 136. Therefore, the dispersion compensation device 131 of the second embodiment exerts an advantage of flexibly changing the compensation amount of the supervisory compensator.

For example, if the dispersion compensation device 131 of the second embodiment switches the bit rate of an optical signal into a high-speed bit rate thereof and a variation in BER of the optical signal with the compensation amount c31 of the supervisory TODC 501 becomes steep, the compensation amount c31 is shifted toward the optimal compensation amount c21. Thus, an extreme increase of the BER of the optical signal observed by the supervisory optical receiver 136 may be prevented.

In addition, if the bit rate of the optical signal is switched to a low-speed bit rate and a variation in BER of the optical signal with the compensation amount c31 of the supervisory TODC 501 becomes moderate, the compensation amount c31 is shifted away from the optimal compensation amount c21. Therefore, a variation in BER of the optical signal with the compensation amount c31 becomes moderate and the accuracy of detecting a change in BER may be prevented from decreasing.

Alternatively, a control may be performed as follows. In FIG. 5, for example, a storage unit (not shown) is installed in the control unit 137. As such, the relationship between the bit rate of an optical signal and the value of compensation amount may stored in the storage unit in advance. For example, the operator provides the control unit 137 with the bit rate value of the optical signal to be operated. The control unit 137 assigns an appropriate dispersion compensation amount to the supervisory TODC 501 depending on the bit rate value of the given optical signal. Based on the above control, a suitable dispersion compensation amount can be assigned to the supervisory TODC 501 depending on the bit rate of the optical signal.

Furthermore, if the compensation amount of the TODC 134 is changed (step S709 in FIG. 7), the control unit 137 adjusts the compensation amount of the supervisory TODC 501 to an insufficient or excessive compensation amount again (step S705 in FIG. 7). Therefore, the distance d32 can be kept constant even if the amount of chromatic dispersion of an input optical signal varies. Therefore, such a configuration can avoid a false operation due to an increase in compensation amount c31 more than the optimal compensation amount c21 and also prevent the observation of the BER from being unstable due to a significant increase in BER monitored by the supervisory optical receiver 136.

Third Embodiment

Figure 8:
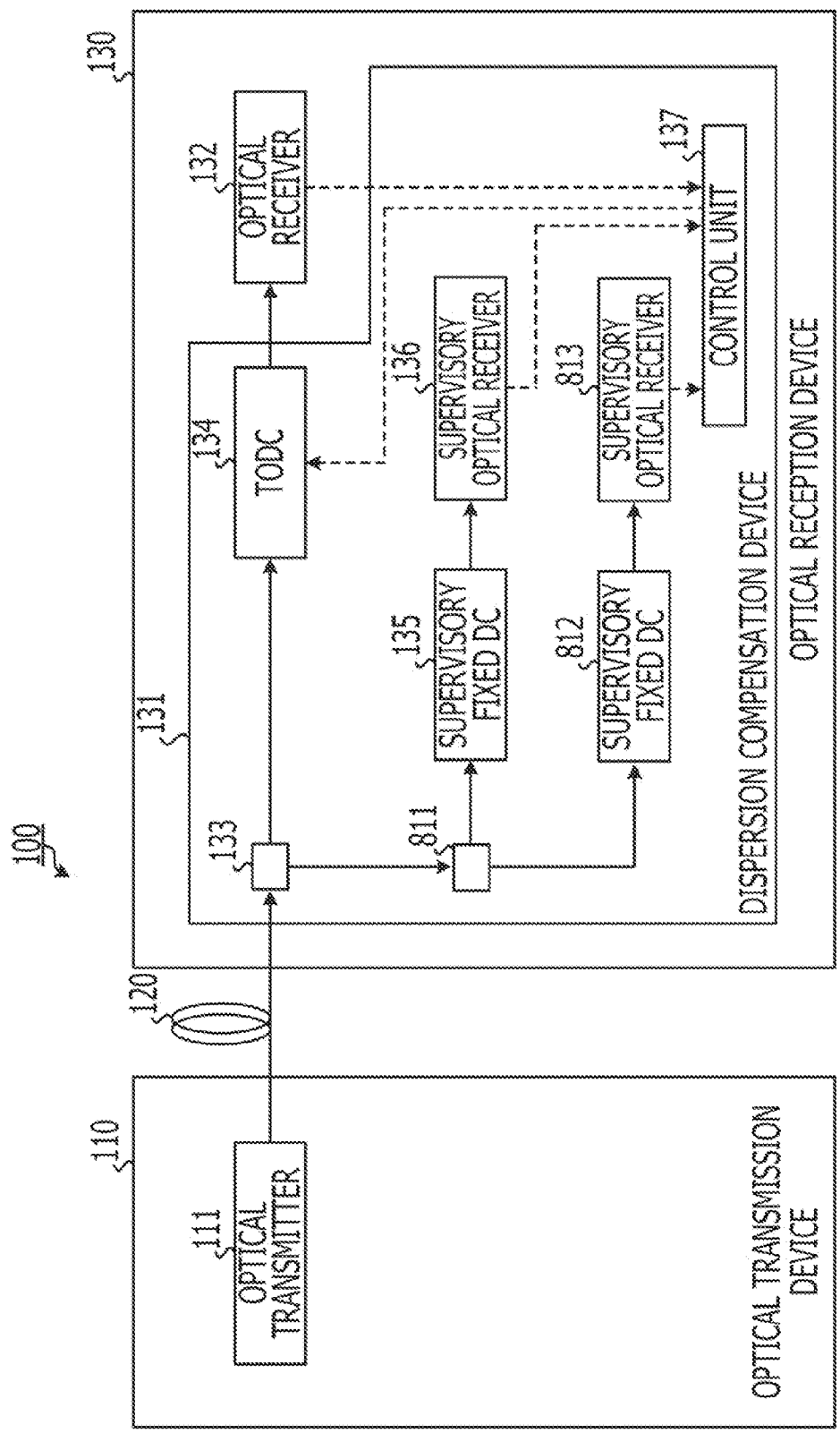
FIG. 8 is a block diagram illustrating the functional configuration of an optical transmission system according to a third embodiment.

FIG. 8 is a block diagram illustrating the functional configuration of an optical transmission system according to a third embodiment. In FIG. 8, components already described with reference to FIG. 1 are denoted by the same reference numerals, and thus detailed description thereof will be hereinafter omitted. A dispersion compensation device 131 of the third embodiment includes an optical coupler 811, a supervisory fixed DC 812, and a supervisory optical receiver 813 in addition to the structural components shown in FIG. 1. Therefore, even if the amount of chromatic dispersion of an optical signal changes significantly the direction of variation in chromatic dispersion can be determined appropriately.

The optical coupler 811 further branches one of the optical signals branched by the optical coupler 133. Then, one of the optical signals branched by the optical coupler 811 is output to a supervisory fixed DC 135. In addition, the other of the optical signals branched by the optical coupler 811 is output to the supervisory fixed DC 812.

The supervisory fixed DC 135 is a first supervisory dispersion compensator that performs dispersion compensation on one of the optical signals branched by the optical coupler 133 using a compensation amount insufficient to the amount of chromatic dispersion of the optical signal. On the other hand, the supervisory fixed DC 812 is a second supervisory dispersion compensator that performs dispersion compensation on the other of the optical signals branched by the optical coupler 811 using a compensation amount excessive to the amount of chromatic dispersion of the optical signal. The supervisory fixed DC 135 performs dispersion compensation on one part of the input optical signal using a compensation amount insufficient to the amount of chromatic dispersion of the optical signal and then outputs to the supervisory optical receiver 136. The supervisory fixed DC 812 performs dispersion compensation on the other part of the input optical signal using a compensation amount excessive to the amount of chromatic dispersion of the optical signal and then outputs to the supervisory optical receiver 813.

The supervisory optical receiver 813 monitors the communication quality of an optical signal output from the supervisory fixed DC 812. Specifically, like the supervisory optical receiver 136, the supervisory optical receiver 813 calculates BER as information that represents the communication quality of the optical signal and then outputs the BER to the control unit 137. The control unit 137 can determine the direction of variation in chromatic dispersion of the optical signal based on the direction of variation in each BER output from the supervisory optical receiver 136 and the supervisory optical receiver 813. The method for determining the direction of variation in chromatic dispersion of an optical signal will be described later.

Figure 9:
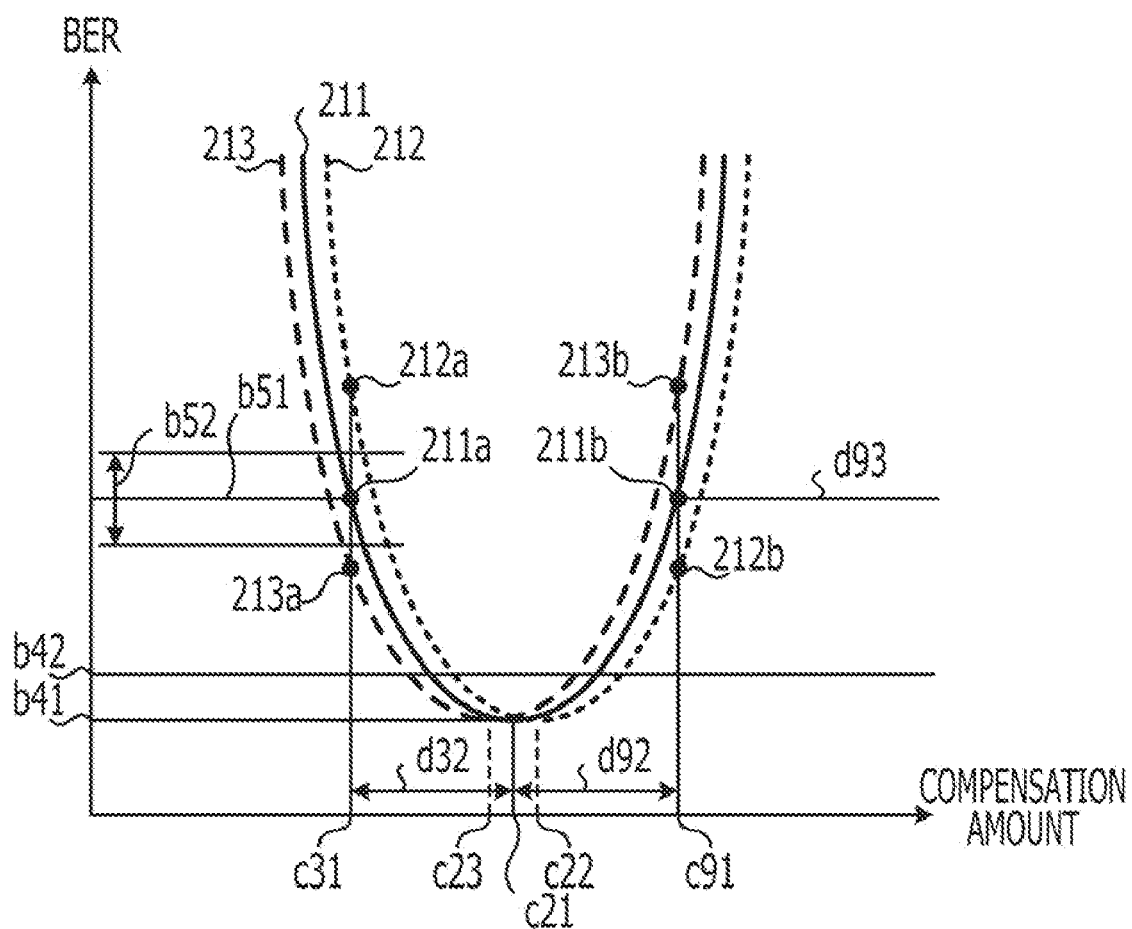
FIG. 9 is a graphic diagram illustrating an example of setting of the compensation amount of each fixed DC illustrated in FIG. 8.

FIG. 9 is a graphic diagram illustrating an example of setting of the compensation amount of each fixed DC illustrated in FIG. 8. In FIG. 9, structural components already described with reference to FIG. 2 are denoted by the same reference numerals, and thus detailed description thereof will be hereinafter omitted. As described above with respect to FIG. 2, the compensation amount c31 of the supervisory fixed DC 135 is set to a compensation amount insufficient to the optimal compensation amount c21. On the other hand, the compensation amount c91 of the supervisory fixed DC 812 is set to a compensation amount excessive to the optimal compensation amount c21.

In addition, the compensation amount c91 is set so that the distance d92 between the compensation amount c91 and the optimal compensation amount c21 is sufficient to allow the compensation amount c91 to substantially always be higher than the optimal compensation amount c21 even if the amount of chromatic dispersion of an optical signal changes with the passage of time. Here, both the compensation amount c31 and the compensation amount c91 are set up so that the respective BERs calculated by the supervisory optical receiver 136 and supervisory optical receiver 813 can be almost equal to one another, respectively. For this reason, the distance d32 and the distance d92 are substantially equal to each other.

If the amount of chromatic dispersion of the optical signal input to the dispersion compensation device 131 from the transmission line 120 increases (see the characteristic curve 212), then the BER of the optical signal received by the supervisory optical receiver 813 decreases (from point 211b to point 212b). On the other hand, if the amount of chromatic dispersion of the optical signal input to the dispersion compensator 131 from the transmission line 120 decreases (see the characteristic curve 213), then the BER of the optical signal received by the supervisory optical receiver 813 increases (from point 211b to point 213b).

Therefore, the direction of variation in BER of the optical signal received by the supervisory optical receiver 813 varies depending on the direction of variation in chromatic dispersion of the optical signal input to the dispersion compensation device 131. Furthermore, the direction of variation in BER output from the supervisory optical receiver 136 and the direction of variation in BER output from the supervisory optical receiver 813 are opposite to each other with respect to a variation in chromatic dispersion of the optical signal.

Figure 10:
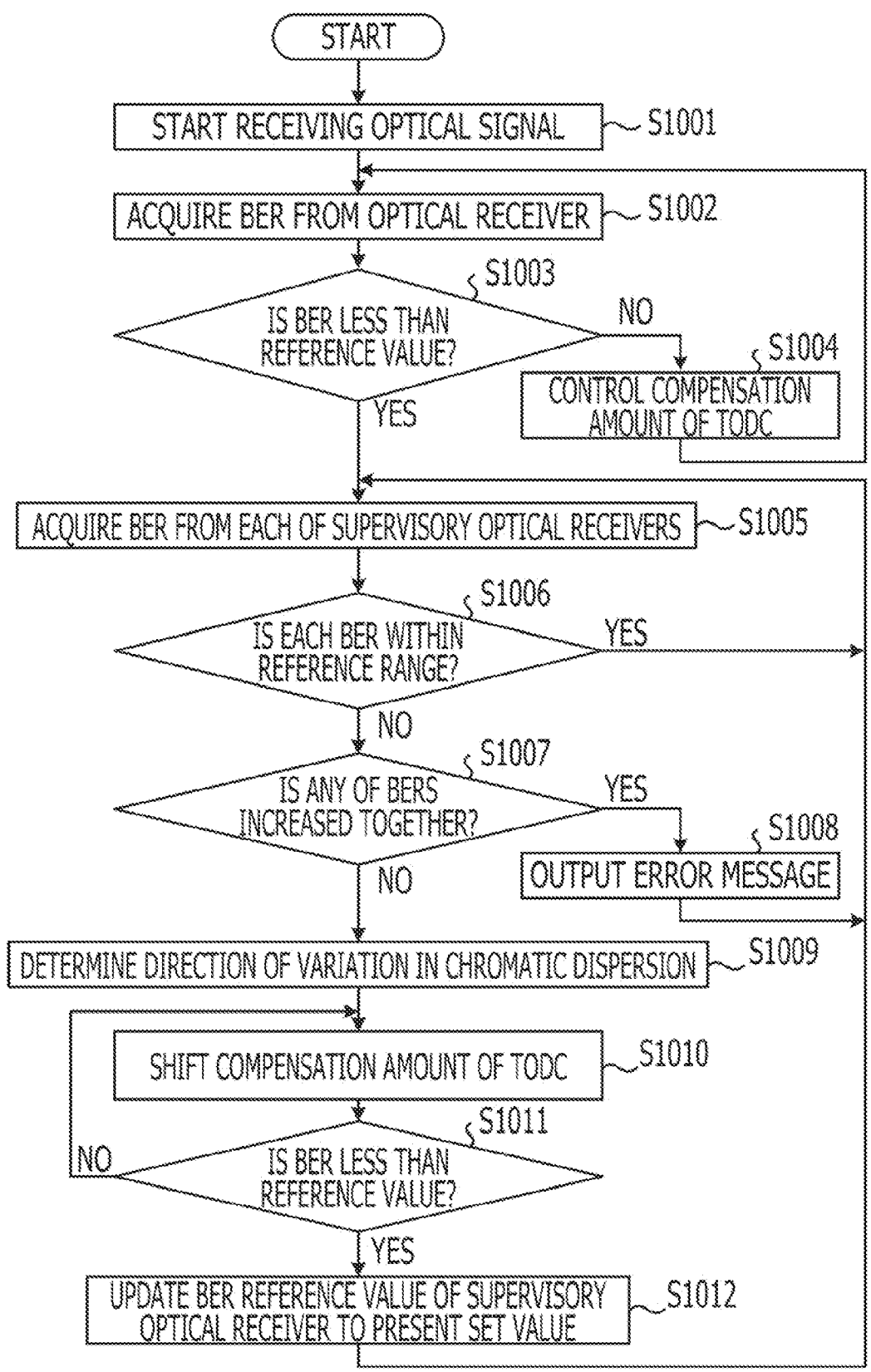
FIG. 10 is a flow chart illustrating an example of the operation of a control unit illustrated in FIG. 8.

FIG. 10 is a flow chart illustrating an exemplary operation of the control unit illustrated in FIG. 8. Steps S1001 to S1004 shown in FIG. 10 are the same as the steps S301 to S304 shown in FIG. 3, so that the descriptions thereof will be omitted. If the BER is less than the reference value b42 (see FIG. 2) in step S1003 (step S1003: YES), the control unit 137 acquires BER b51 and BER d93 (each BER, see FIG. 9) from the supervisory optical receiver 136 and the supervisory optical receiver 813 (each supervisory optical receiver) (step S1005).

Subsequently, the control unit 137 determines whether each BER acquired by step S1005 is in the reference range b52 (see FIG. 9) (step S1006). If each of the BERs acquired by step S1005 is in the reference range b52 (step S1006: YES), then the control unit 137 returns to step S1005 and then continues the procedure. If each of the BERs is not within the reference range b52 (step S1006: NO), the control unit 137 determines whether each of the BERs acquired by step S1005 increases (step S1007).

In Step S1006, if each of the BERs increases (step S1007: YES), the control unit 137 outputs an error message that notifies a decrease in communication quality due to a factor other than the variation in chromatic dispersion of the transmission line 120 (step S1008). Subsequently, the process returns to step S1005 and then continues. If each of the BERs does not increase (step S1007: NO), or at least one of the BERs does not increase, then the control unit 137 shifts to step S1009.

Subsequently, the control 137 determines the direction of variation in chromatic dispersion of the optical signal on the basis of the direction of variation in each of the BERs acquired by step S1005 (for example, the direction of variation from each of the BERs acquired by step S1005 in the first loop) (step S1009). Steps S1010 to S1012 are the same as the steps S308 to S310 shown in FIG. 3, so that the descriptions thereof will be omitted.

Figure 11:
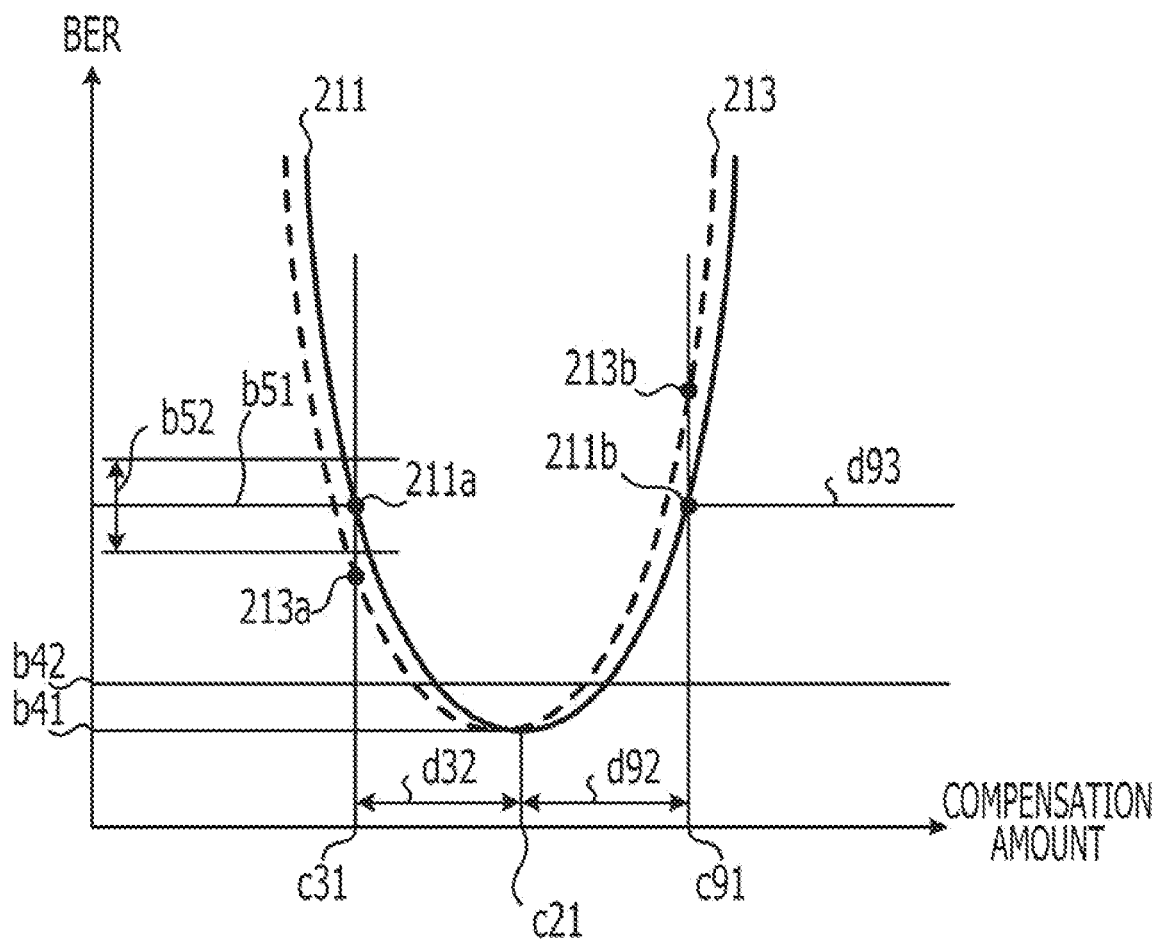
FIG. 11 is a graphic diagram illustrating a first example of a change in BER characteristic with respect to the compensation amount.

FIG. 11 is a graphic diagram illustrating a first example of a change in BER characteristic with respect to the compensation amount. In FIG. 11, components already described with reference to FIG. 9 are denoted by the same reference numerals, and thus detailed description thereof will be hereinafter omitted. FIG. 11 illustrates the characteristics of BER of an optical signal with the compensation amount of chromatic dispersion when the amount of chromatic dispersion of the optical signal input to the dispersion compensation device 131 from the transmission line 120 decreases.

If the amount of chromatic dispersion of the optical signal decreases (characteristic curve 213), then the BER output from the supervisory optical receiver 136 decreases (from point 211a to point 213a), while the BER output from the supervisory optical receiver 813 increases (from point 211b to point 213b). If the BER from the supervisory optical receiver 813 increases while the BER from the supervisory optical receiver 136 decreases, the control unit 137 determines that the amount of chromatic dispersion of the optical signal decreases and then lowers the compensation amount of the TODC 134.

An increase in amount of chromatic dispersion of the optical signal increases (characteristic curve 212 in FIG. 9) leads to an increase in BER output from the supervisory optical receiver 136 (from point 211a to point 212a). In addition, the BER output from the supervisory optical receiver 813 decreases (from point 211b to point 212b). If the BER from the supervisory optical receiver 813 decreases while the BER from the supervisory optical receiver 136 increases, the control unit 137 determines that the amount of chromatic dispersion of the optical signal increases. Then, the control unit 137 permits an increase in compensation amount of the TODC 134.

Figure 12:
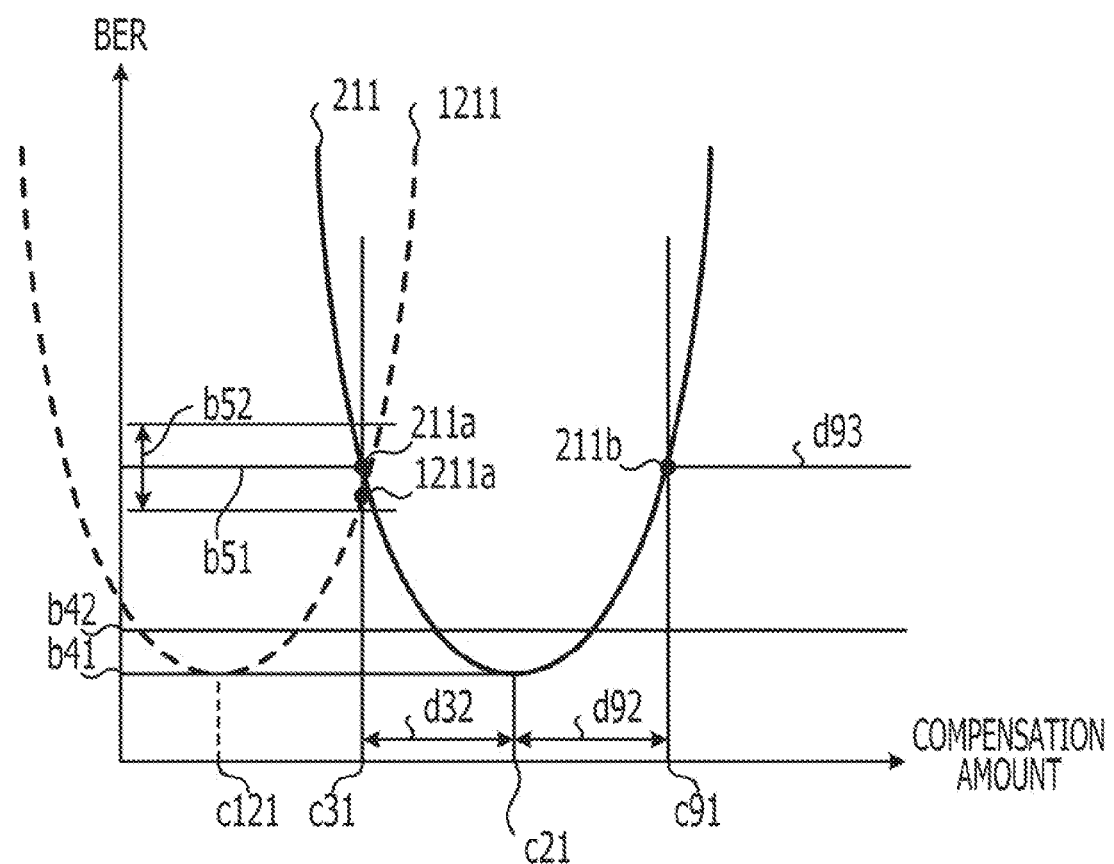
FIG. 12 is a diagram illustrating a second example of a change in BER characteristic with respect to the compensation amount.

FIG. 12 is a diagram illustrating a second example of a change in BER characteristic with respect to the compensation amount. In FIG. 12, components already described with reference to FIG. 9 are denoted by the same reference numerals, and thus detailed description thereof will be hereinafter omitted. FIG. 12 illustrates the characteristics of BER of an optical signal with the compensation amount of chromatic dispersion when the amount of chromatic dispersion of the optical signal input to the dispersion compensation device 131 decreases.

Here, the optimal compensation amount is less than the compensation amount c31 of the supervisory fixed DC 135 (dashed line c121). The BER b51 output from the supervisory optical receiver 136 is within the reference range b52 (point 1211a). On the other hand, the BER d93 output from the supervisory optical receiver 813 increases to out of the reference range b52 (point 213b, not shown). As the characteristic curve 211 shifts to the characteristic curve 1211, the BER b51 becomes smaller than the reference range b52 and then further decreases lower than the reference range b52, followed by increasing again within the reference range b52.

On the other hand, the BER d93 always increases with a change from the characteristic curve 211 to the characteristic curve. In step S1009 shown in FIG. 10, the control unit 137 determines the direction of variation in chromatic dispersion based on the direction of variation in BER d93 out of the reference range b52. In this case, the BER d93 output from the supervisory optical receiver 813 increases. Thus, the control unit 137 determines that the amount of chromatic dispersion of the optical signal input into the dispersion compensation device 131 has decreased.

Next, there will be described a case where an extreme increase in amount of chromatic dispersion of an optical signal input to the dispersion compensation device 131 occurs and the BER b51 becomes out of the reference range b51 to place the BER d93 within the reference range b52. In this case, the BER b51 always increases to cause a change in characteristic curve 211. On the other hand, the BER d93 becomes smaller than the reference range b52 and becomes lower than the minimum value b41 with respect to the change in characteristic curve 211, followed by being shifted within the reference range b52.

In step S1009 shown in FIG. 10, the control unit 137 determines the direction of variation in chromatic dispersion based on the direction of variation in BER b51 out of the reference range b52. In this case, the BER b51 output from the supervisory optical receiver 136 increases. Thus, the control unit 137 determines that the amount of chromatic dispersion of the optical signal input into the dispersion compensation device 131 has increased.

In this way, if one of the BER b51 and BER d93 is within the reference range b52, and the other thereof is out of the reference range b52, the control unit 137 determines the direction of variation in chromatic dispersion of the optical signal based on the direction of variation in BER out of the reference range b52. Therefore, even if the direction of increase in chromatic dispersion of the optical signal input to the dispersion compensation device 131 decreases or increases extremely, while one of BER b51 and BER d93 is shifted into the reference range b52 again through the minimum value b41, the direction of variation in chromatic dispersion can be determined appropriately.

Figure 13:
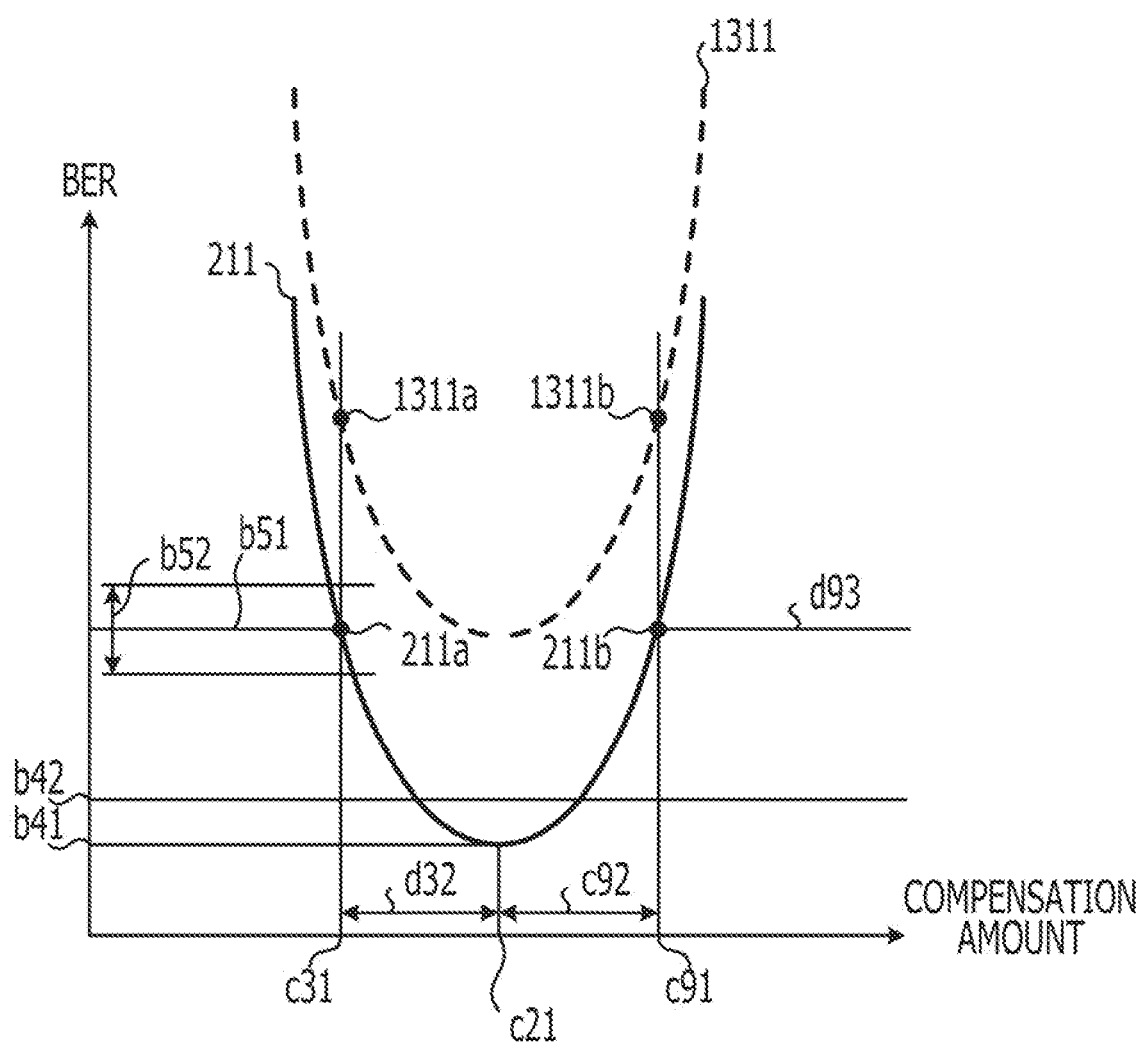
FIG. 13 is a diagram illustrating a third example of a change in BER characteristic with respect to the compensation amount.

FIG. 13 is a diagram illustrating a third example of a change in BER characteristic with respect to the compensation amount. In FIG. 13, components already described with reference to FIG. 9 are denoted by the same reference numerals, and thus detailed description thereof will be hereinafter omitted. FIG. 13 illustrates the characteristics of BER of an optical signal with the compensation amount of chromatic dispersion when the communication quality of the optical signal decreases due to a factor other than the variation in chromatic dispersion in the transmission line 120.

In this case, since the BER of the optical signal decreases irrespective of the compensation amount of chromatic dispersion, the entire characteristic curve 211 is shifted upward as represented by the characteristic curve 1311 in the figure. Thus, the BER output from the supervisory optical receiver 136 and the BER output the supervisory optical receiver 813 are simultaneously increased (from point 211a to point 1311a and from point 211b to point 1311b).

In this case, the control unit 137 outputs an error message to the user or the host system (see step S1008 in FIG. 10). In the above description, the case where the dispersion compensation control is continued after output of an error message has been described with reference to FIG. 10 (from step S1008 to step S1005). Alternatively, the dispersion compensation control may be terminated after output of an error message.

As described with reference to FIG. 11 to FIG. 13, the control unit 137 can determine the direction of variation in chromatic dispersion of the optical signal based on each of BERs output from the supervisory optical receiver 136 and the supervisory optical receiver 813. Therefore, the control unit 137 can appropriately determine the variation in chromatic dispersion of the optical signal under the respective conditions shown in FIG. 11 and FIG. 12. For example, as shown in FIG. 12, even if an extreme change in amount of chromatic dispersion of an optical signal occurs, the direction of variation in chromatic dispersion can be determined appropriately.

Furthermore, as described with reference to FIG. 13, the control unit 137 can detect that the communication quality is decreased due to a factor other than the variation in chromatic dispersion based on each of BERs output from the supervisory optical receiver 136 and the supervisory optical receiver 813. In addition, by terminating the dispersion compensation control when the communication quality is decreased due to a factor other than the variation in chromatic dispersion, the compensation amount of TODC 134 can be prevented from being continuously controlled uselessly.

Figure 14:
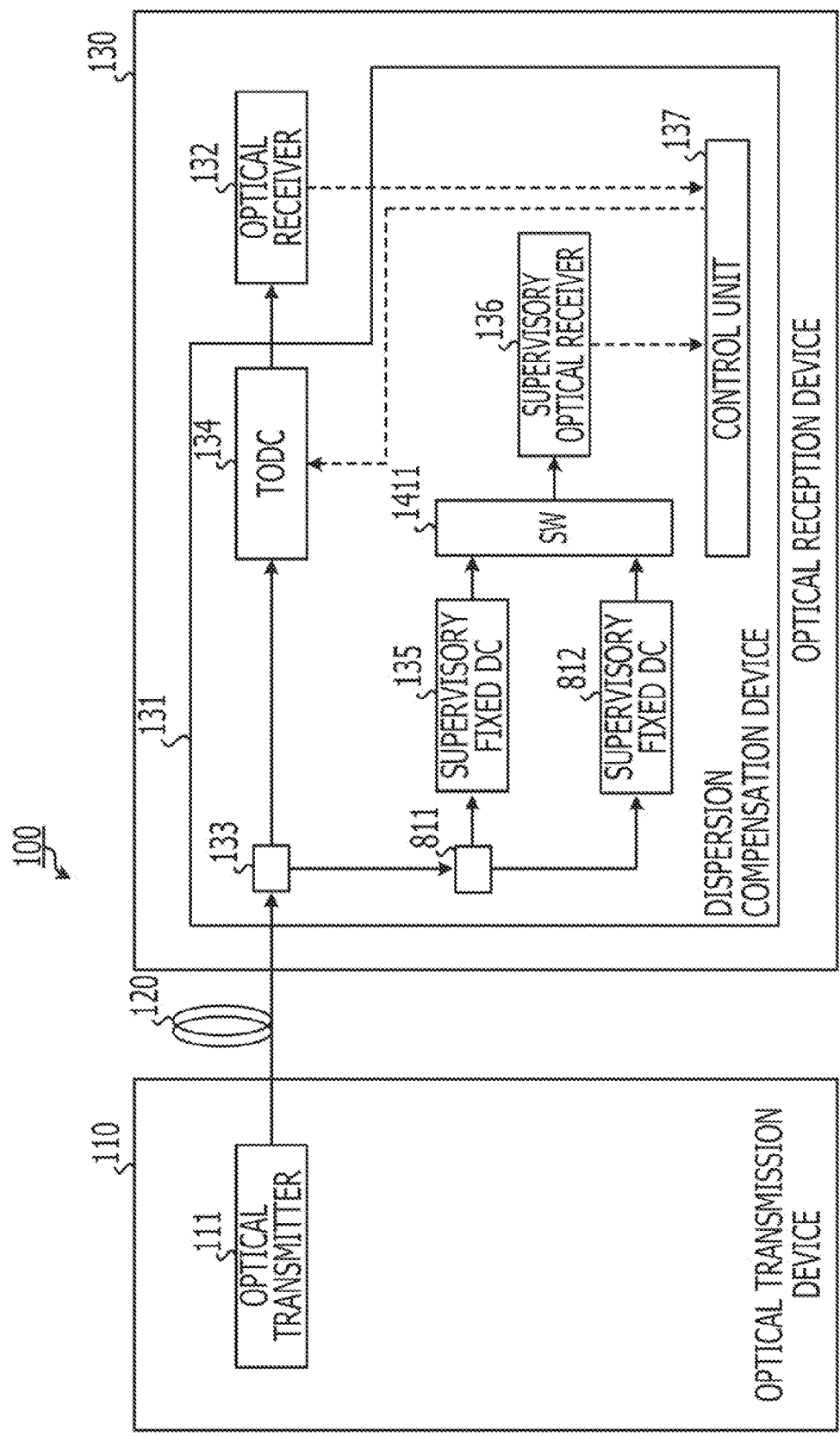
FIG. 14 is a block diagram illustrating a modified example of the optical transmission system illustrated in FIG. 8.

FIG. 14 is a block diagram illustrating a modified example of the optical transmission system illustrated in FIG. 8. In FIG. 14, components already described with reference to FIG. 8 are denoted by the same reference numerals, and thus detailed description thereof will be hereinafter omitted. As shown in FIG. 14, the dispersion compensation device 131 of the third embodiment may include an optical switch (SW) 1411 instead of the supervisory optical receiver 813 shown in FIG. 8.

Each of the supervisory fixed DC 135 and the supervisory fixed DC 812 outputs a dispersion-compensated optical signal to the optical switch 1411. The optical switch 1411 outputs one of optical signals output from the supervisory fixed DC 135 and the supervisory fixed DC 812 to the supervisory fixed receiver 136. The supervisory optical receiver 136 calculates the BER of the optical signal output from the optical switch 1411 and then outputs the calculated BER to the control unit 137.

In step S1005 shown in FIG. 10, first, the control unit 137 controls the optical switch 1411 to output an optical signal generated from the supervisory fixed DC 135. Thus, the dispersion-compensated optical signal is input into the supervisory optical receiver 136 by the supervisory fixed DC 135. Therefore, from the supervisory optical receiver 136, the control unit 137 can acquire the BER of an optical signal which is dispersion-compensated by the supervisory fixed DC 135.

Next, the control unit 137 controls the optical switch 1411 so that the optical signal output from the supervisory fixed DC 812. Therefore, the optical signal dispersion-compensated by the supervisory fixed DC 812 can be input to the supervisory optical receiver 136. Therefore, the control unit 137 can acquire the BER of the optical signal, which is dispersion-compensated by the supervisory fixed DC 812, from the supervisory optical receiver 136. Subsequently, the control unit 137 shifts to step S1006.

In this way, the control unit 137 controls the optical switch 1411 so that an optical signal output from the optical switch 1411, among the respective optical signal output from the supervisory fixed DC 135 and the supervisory fixed DC 812 may be obtained. Therefore, even if any supervisory optical receiver 813 (see FIG. 8) is not installed, the BER of an optical signal which is dispersion-compensated by compression amount insufficient to the amount of chromatic dispersion and the BER of an optical signal which is dispersion-compensated by compression amount excessive to the amount of chromatic dispersion, can be obtained.

For this reason, the supervisory optical receiver 813 can be omitted from the configuration shown in FIG. 8. Thus, the manufacturing costs of the dispersion compensation device 131 as well as the size reduction thereof can be attained. Furthermore, either an optical signal output from the supervisory fixed DC 135 or an optical signal output from the supervisory fixed DC 812 is output from the optical switch 1411 as a result of switching under the control of the control unit 137 with an arbitrarily order of switching.

Therefore, the dispersion compensation device 131 of the third embodiment determines the direction of variation in chromatic dispersion of an optical signal based on the BER of an optical signal subjected to dispersion compensation with an insufficient compensation amount (first compensation amount) and the BER of an optical signal subjected to dispersion compensation with an excessive compensation (second compensation amount). Therefore, according to the third embodiment, the direction of variation in chromatic dispersion can be determined even if an extreme variation in amount of chromatic dispersion of the optical signal occurs.

Especially when the bit rate of the optical signal is high, a steep variation of the BER of the optical signal with respect to the compensation amount of chromatic dispersion occurs. Therefore, when determining one of the above BERs, the direction of variation in chromatic dispersion may be mistakenly determined. In this case, however, such an erroneous determination can be avoided by performing the determination using both the BER of the optical signal subjected to dispersion compensation with an insufficient compensation amount and the BER of the optical signal subjected to dispersion compensation.

Furthermore, the control unit 137 can detect that the communication quality is decreased due to a factor other than the variation in chromatic dispersion based on each of BERs output from the supervisory optical receiver 136 and the supervisory optical receiver 813. In addition, when the communication quality is decreased due to a factor other than the variation in chromatic dispersion, the dispersion compensation control may be terminated. Thus, the compensation amount of TODC 134 can be prevented from being continuously controlled uselessly.

In addition, the optical signal received by the optical receiver 132 may be branched by the optical coupler 811 and the branched optical signal is then dispersion-compensated by the supervisory fixed DC 812. Thereby, even if the supervisory fixed DC 812 performs dispersion compensation with an excessive compensation amount, an increase in amount of chromatic dispersion of the optical signal (real signal) received by the optical receiver 132 does not occur. Therefore, there is no need of increasing the compensation amount of the TODC 134, so that an increase in size of the device and an increase in production cost thereof can be prevented.

Alternatively, the supervisory fixed DC 132 is arranged so that it can perform dispersion compensation on the optical signal received by the optical receiver 812 before branching the optical signal. For example, the supervisory fixed DC 812 may be arranged upstream of the optical coupler 133. In this case, the compensation amount of the TODC 134 may be appropriately selected based on the amount of chromatic dispersion of the optical signal (real signal) received by the optical receiver 132.

Alternatively, the configuration of the dispersion compensation device 131 may be designed without including the supervisory fixed DC 812 and supervisory optical receiver 813. For example, the configuration of the dispersion compensation device 131 may be designed as shown in FIG. 5. Furthermore, the control unit 137 controls the compensation amount of the supervisory TODC 501 to alternately switch the amount of chromatic dispersion of an optical signal and the amount of chromatic dispersion of an optical signal.

The operation of the dispersion compensation device 131 in this case is the same as that of each step shown in FIG. 10. However, in step S1005, each BER is acquired by changing the compensation amount of the supervisory TODC 501. Therefore, even if the amount of chromatic dispersion of an optical signal changes significantly the direction of variation in chromatic dispersion can be determined appropriately. In addition, compared with the configuration shown in FIG. 8, the supervisory fixed DC 812 and supervisory optical receiver 813 can be omitted. Therefore, the number of structural components is reduced, so that the size reduction and the manufacturing cost reduction of the device can be attained.

Furthermore, the configuration of the dispersion compensation device 131 shown in FIG. 8 or FIG. 14 may include the supervisory TODC 501 (see FIG. 5) instead of the supervisory fixed DC 135 and the supervisory fixed DC 812.

Fourth Embodiment

Figure 15:
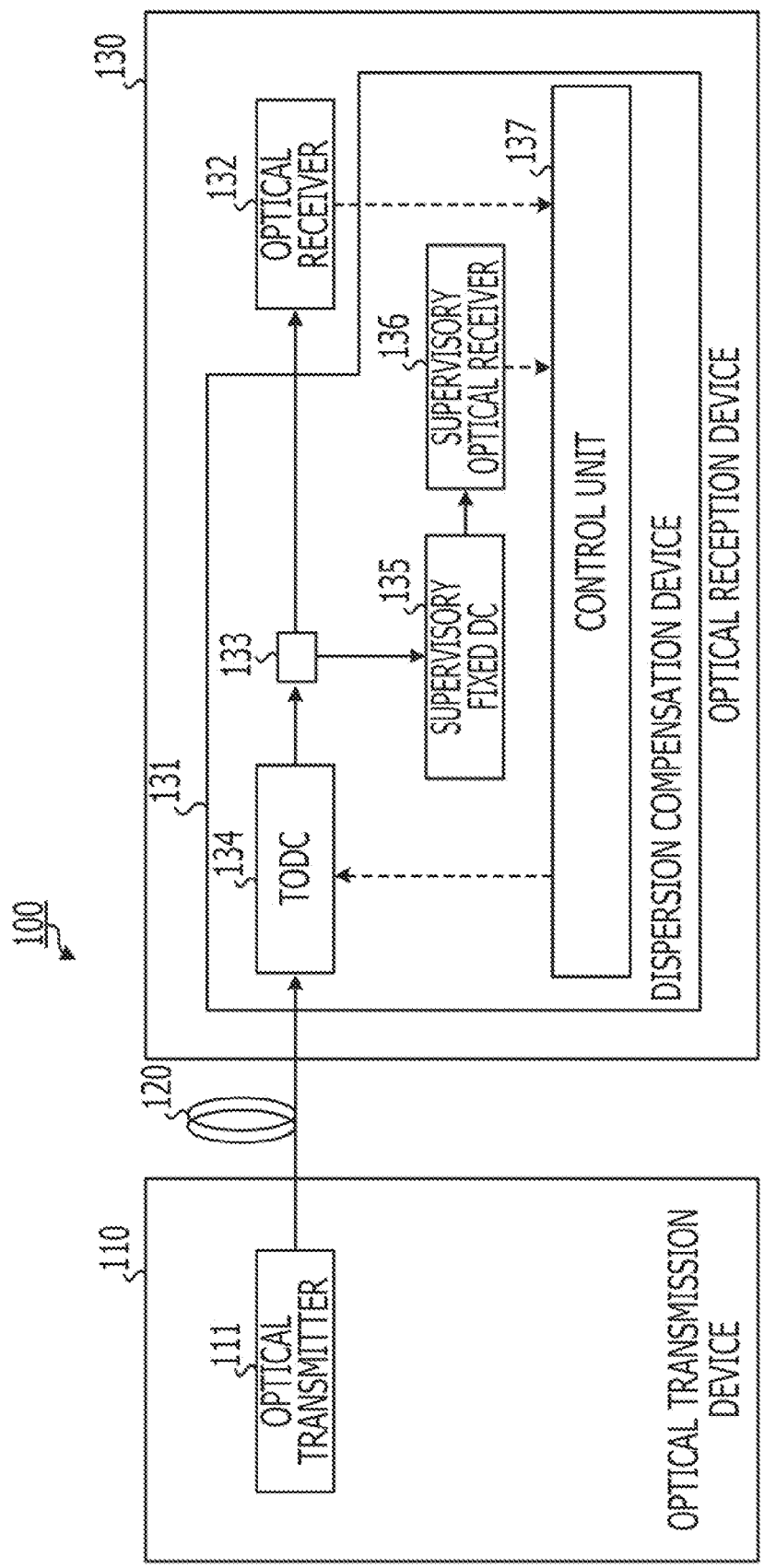
FIG. 15 is a block diagram illustrating the functional configuration of an optical transmission system according to a fourth embodiment.

FIG. 15 is a block diagram illustrating the functional configuration of an optical transmission system according to a fourth embodiment. In FIG. 15, components already described with reference to FIG. 1 are denoted by the same reference numerals, and thus detailed description thereof will be hereinafter omitted. As shown in FIG. 15, in a dispersion compensation device 131 of the fourth embodiment, an optical coupler 133 is arranged on the downstream side of a TODC 134. Therefore, the dispersion compensation control of the dispersion compensation device 131 may be continuously performed at high speed in a stable manner.

The TODC 134 performs dispersion compensation on an optical signal transmitted from an optical transmission device 110 through a transmission line 120 and then outputs the dispersion-compensated optical signal to an optical coupler 133. The optical coupler 133 is provided for branching the optical signal output from the TODC 134. The optical coupler 133 outputs the branched optical signals to an optical receiver 132 and a supervisory fixed DC 135, respectively.

Figure 16:
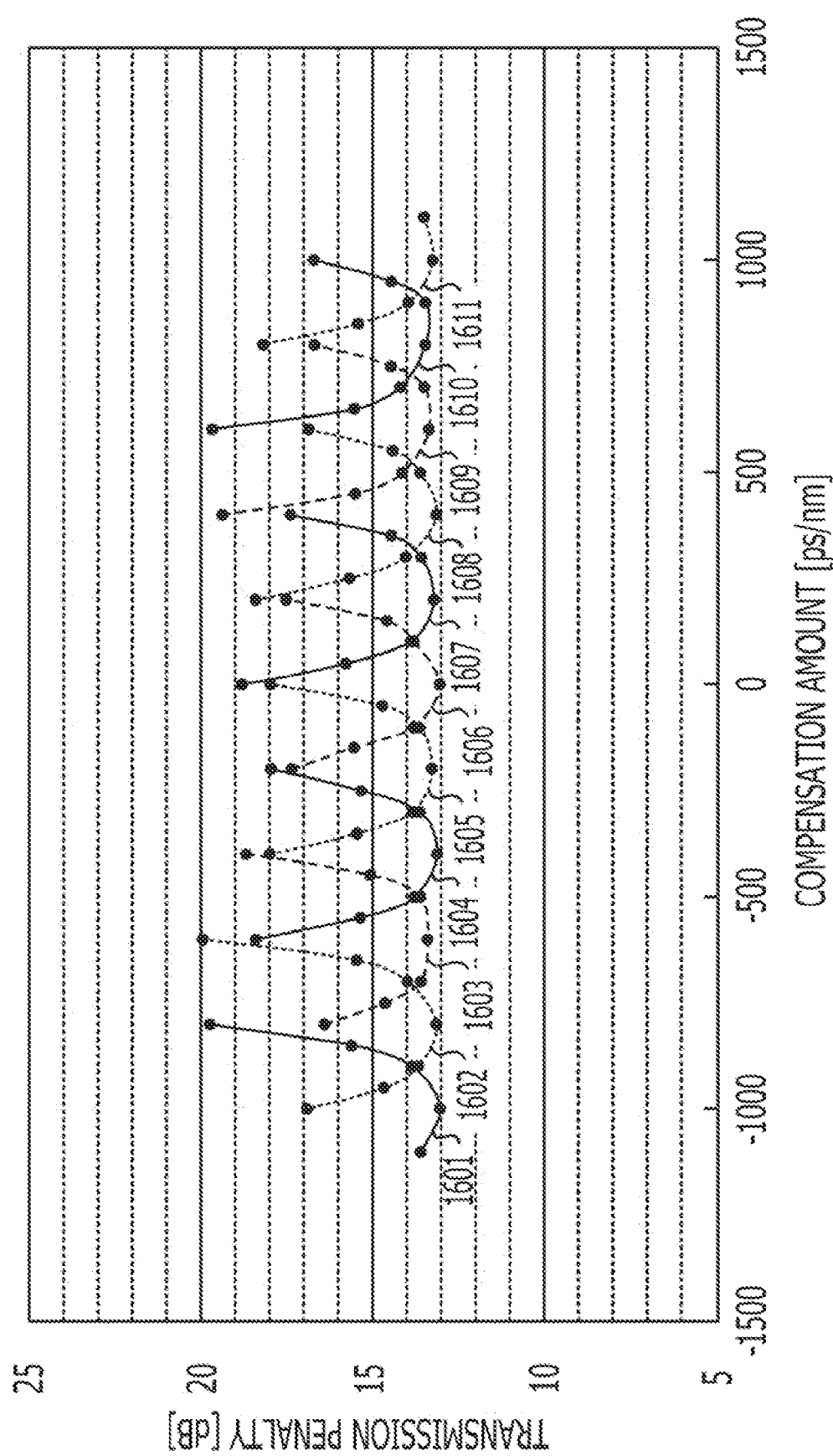
FIG. 16 is a graphic diagram illustrating the actual measurement value of transmission penalty of the amount of chromatic dispersion in each transmission line.

FIG. 16 is a graphic diagram illustrating actual measurement values of transmission penalty of the amount of chromatic dispersion in each transmission line. In FIG. 16, the horizontal axis represents the compensation amount [ps/nm] of chromatic dispersion performed on an optical signal by the TODC 134 or the supervisory fixed DC 135. The vertical axis represents the transmission penalty [dB] of the optical signal received by the optical receiver 132 or the supervisory optical receiver 136.

Each of the characteristic curves 1601 to 1611 represents the transmission penalty characteristic of an optical signal subjected to dispersion compensation by the TODC 134. In addition, the characteristic curves 1601 to 1611 represent characteristic features which are obtained when the amounts of chromatic dispersion generated in the optical signal in the transmission line 120 (the amount of chromatic dispersion in transmission line) are −1000, −800, −600, −400, −200, and 0, 200, 400, 600, 800 and 1000 [ps/nm], respectively.

As represented by each of the characteristic curves 1601 to 1611, it is found that the transmission penalty characteristics (minimum value and steepness of change) of optical signals are substantially identical with one another. Therefore, if the amount of chromatic dispersion in the transmission line is changed, the compensation amount of TODC 134 can be adjusted to the optimal compensation amount c21 (see FIG. 2). The relationship between the optimal compensation amount c21 and the compensation amount c31 of the supervisory fixed DC 135 (see FIG. 2) (distance d32 shown in FIG. 2) is always held constant (i.e., residual dispersion tolerance is held constant).

For this reason, even if continuous execution of the dispersion compensation control by the dispersion compensation device 131 is performed, the distance d32 between the compensation amount c31 and the optimal compensation amount c21 becomes constant. Thus, there is no need to readjust the distance d32 (step S705 after step S709 in FIG. 7) after control of the compensation amount of the supervisory TODC 501. Therefore, the dispersion compensation control of the dispersion compensation device 131 can be continuously performed in a stable manner even if the supervisory TODC 501 (see FIG. 5) is not installed in place of the supervisory fixed DC 135.

In the configuration shown in FIG. 15, furthermore, the supervisory fixed TODC 501 (see FIG. 5) may be installed in place of the supervisory fixed DC 135, but such a modified configuration is not shown in the figure. In this case, an exemplary operation of the dispersion compensation device 131 continues processing by returning the process to step S706 when the compensation amount of the TODC 134 is changed in step S709 in FIG. 7. In other words, in this case, step S705 after step S709 can be skipped.

As described above, the dispersion compensation device 131 of the fourth embodiment allows the optical coupler 133 to branch the optical signal on the downstream of the TODC 134. Therefore, the optical signal, on which the variation in the amount of chromatic dispersion in the transmission line is compensated by the TODC 134, can be dispersion-compensated by the TODC 135.

Thus, the distance d32 between the compensation amount c31 and the optimal compensation amount c21 of the supervisory fixed DC 135 can be held constant even if the amount of chromatic dispersion in the transmission line varies. Therefore, such a configuration can avoid a false operation due to an increase in compensation amount c31 to more than the optimal compensation amount c21. It can also prevent the observation of the BER b51 from being unstable due to a significant increase in BER b51 monitored by the supervisory optical receiver 136.

Furthermore, if the compensation amount of the TODC 134 is changed (step S709 in FIG. 7), the distance d32 between the compensation amount c31 and the optimal compensation amount c21 can be held constant even if the control unit 137 does not adjust the compensation amount of the supervisory TODC 501 to an insufficient or excessive compensation amount again (step S705 in FIG. 7). Therefore, the dispersion compensation control of the dispersion compensation device 131 can be continuously performed at high speed in a stable manner.

Therefore, the dispersion compensation control of the dispersion compensation device 131 can be continuously performed in a stable manner even if the supervisory TODC 501 (see FIG. 5) is not installed in place of the supervisory compensator (here, the supervisory fixed DC 135) that performs dispersion compensation on an optical signal received by the supervisory optical receiver 136. Therefore, compared with the case where the supervisory TODC 501 is used as a supervisory compensator, a size reduction and manufacturing cost reduction of the device can be attained.

In the configuration shown in FIG. 15, alternatively, the supervisory fixed TODC 501 (see FIG. 5) may be installed in place of the supervisory fixed DC 135. In this case, the optical signal, on which the variation in the amount of chromatic dispersion in the transmission line is compensated by the TODC 134, can be dispersion-compensated by the supervisory TODC 501. Therefore, the variation in amount of chromatic dispersion of the optical signal subjected to dispersion compensation by the supervisory TODC 501 decreases, so that the variable range of the compensation amount of the supervisory TODC 501 may be reduced. Therefore, compared with the configuration shown in FIG. 5, a size reduction in dispersion compensation device 131 can be attained and a reduction in manufacturing cost can be also attained.

Fifth Embodiment

Figure 17:
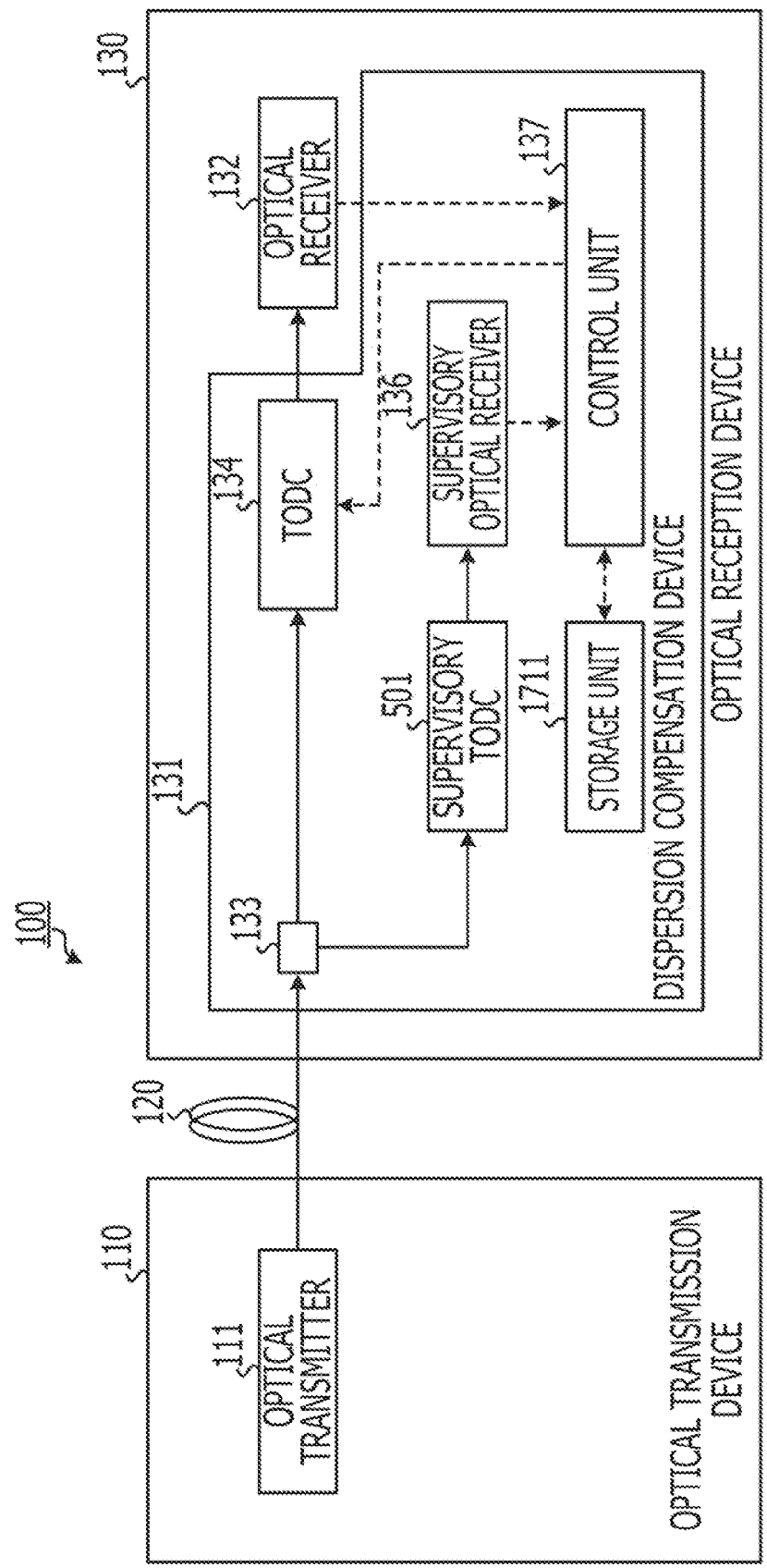
FIG. 17 is a block diagram illustrating the functional configuration of an optical transmission system according to a fifth embodiment.

FIG. 17 is a block diagram illustrating the functional configuration of an optical transmission system according to a fifth embodiment. In FIG. 17, components already described with reference to FIG. 5 are denoted by the same reference numerals, and thus detailed description thereof will be hereinafter omitted. A dispersion compensation device 131 of the fifth embodiment stores correspondence information about the correspondence between the compensation amount of chromatic dispersion to an optical signal and the communication quality of the optical signal and the variation in amount of chromatic dispersion of the optical signal is calculated with reference to the stored correspondence information. As shown in FIG. 17, the dispersion compensation device 131 includes a storage unit 1711 in addition to the structural components shown in FIG. 5.

The storage unit 1711 stores the relationship between the compensation amount of chromatic dispersion to an optical signal and the communication quality of the optical signal. Here, the correspondence information about the above correspondence relationship is information representing the relationship between the compensation about of chromatic dispersion and the BER represented by the characteristic curve 211 shown in FIG. 2. The correspondence information may be, for example, provided as a correspondence table in which the BER of the optical signal is assigned to each of the compensation amounts of chromatic dispersion. Alternatively, the correspondence information may be a function (for example, secondary function) that approximately represents the relationship between the compensation amount of chromatic dispersion and the BER of the optical signal.

In the dispersion compensation control based on the BER from the supervisory optical receiver 136, the control unit 137 calculates the variation in dispersion of the optical signal based on the BER from the supervisory optical receiver 136 and the correspondence information stored in the storage unit

1711. For example, before and after the change in BER from the supervisory optical receiver 136, the control unit 137 acquires compensation amounts corresponding to the BER values before and after the change from the correspondence information stored in the storage unit 1711 and the difference between the acquired compensation amounts is then calculated as the variation in chromatic dispersion of the optical signal.

The control unit 137 changes the compensation amount of the TODC 134 as much as an amount corresponding to the calculated variation in dispersion. For this reason, the control unit 137 can determine the direction of variation in chromatic dispersion of the optical signal based on the direction of variation in BER from the supervisory optical receiver 136. In addition, the control unit 137 can calculate the variation in chromatic dispersion of the optical signal based on the variation in BER from the supervisory optical receiver 136.

The correspondence information is stored in the storage portion 1711 before the dispersion compensation control based on the BER from the supervisory optical receiver 136. For example, as preliminary operation, the control unit 137 prepares correspondence information by acquiring the BER from the supervisory optical receiver 136 while changing the compensation amount of the supervisory TODC 501 before the dispersion compensation control based on the BER from the supervisory optical receiver 136. Then, the control unit 137 stores the prepared correspondence information in the storage unit 1711.

Figure 18:
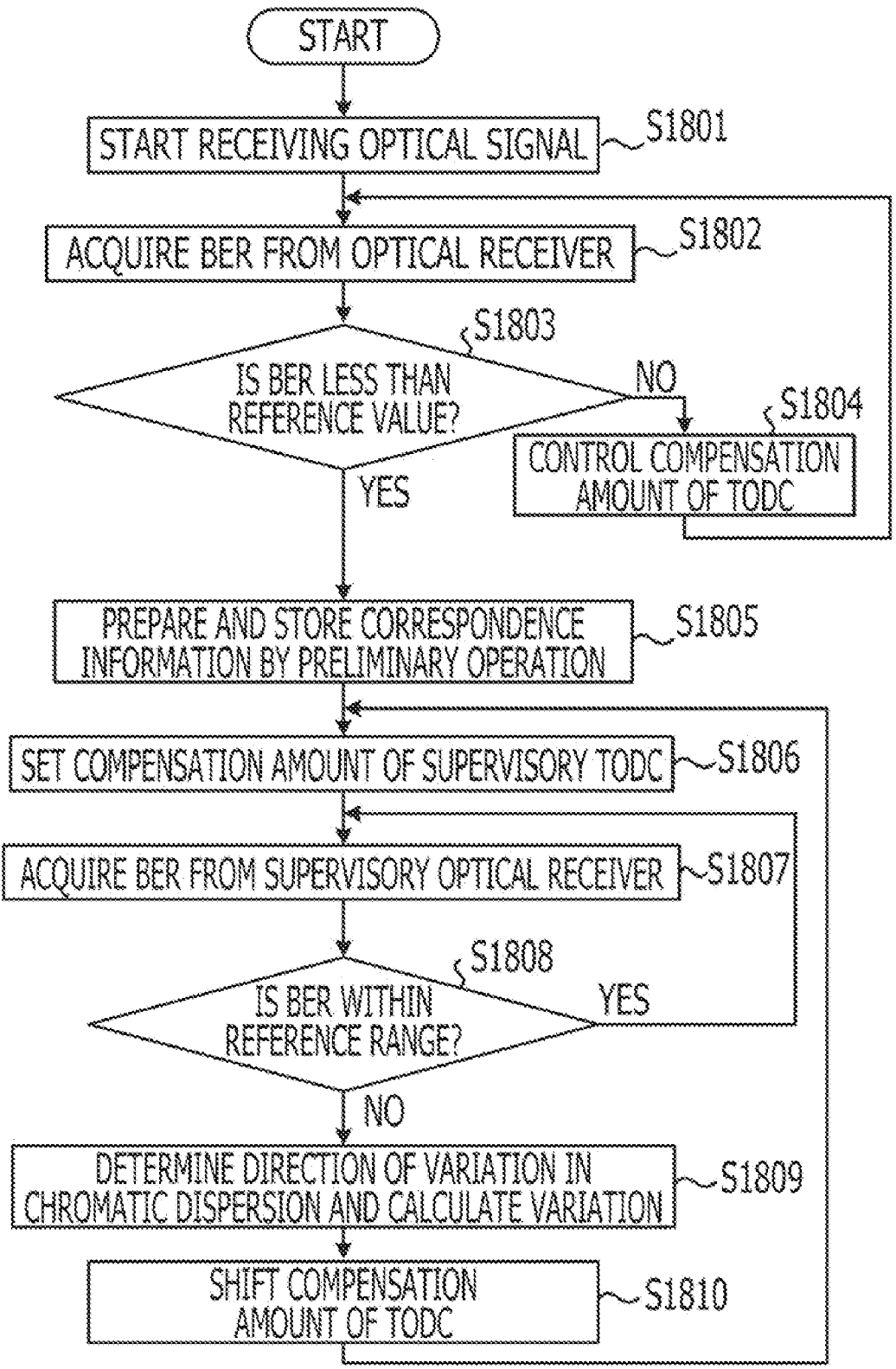
FIG. 18 is a flow chart illustrating an example of the operation of a control unit illustrated in FIG. 17.

FIG. 18 is a flow chart representing an example of the operation of the control unit shown in FIG. 17. Steps S1801 to S1804 shown in FIG. 18 are the same as the steps S701 to S704 shown in FIG. 7, so that the descriptions thereof will be omitted. In step S1803, if BER is less than the reference value b42 (see FIG. 2) (step S1803: YES), the control unit 137 prepares correspondence information by performing the aforementioned preliminary operation and then stores the prepared correspondence information in the storage unit 1711 (step S1805).

Steps S1806 to S1808 are the same as the steps S705 to S707 shown in FIG. 7, so that the descriptions thereof will be omitted. In step S1808, if the BER b51 is out of the reference range b52 (step S1808: NO), then the control unit 137 determines the direction of variation in chromatic dispersion of an optical signal based on the BER b51 and the correspondence information stored in step S1805 and then calculates the variation in chromatic dispersion of the optical signal (step S1809).

Next, the control unit 137 changes the compensation amount of the TODC 134 as much as the calculated variation in the direction corresponding to the variation direction determined in step S1809 (step S1810). Then, the process returns to step S1806 and continues. By repeating steps S1806 to S1810, even if the amount of chromatic dispersion of the optical signal input into the dispersion compensation device 131 changes with change with the passage of time, the BER of the optical signal received by the optical receiver 132 is substantially always controllable within the reference range.

Furthermore, the variation in chromatic dispersion is calculated in step S1809 and the compensation amount of the TODC 134 is then changed as much as the calculated variation in step S1810. Thus, the compensation amount of the TODC 134 may be controlled by performing the control only one time. Therefore, the compensation amount of the TODC 134 can be controlled more accurately at high speed.

In addition, but not shown in the figure, after the calculation of variation in chromatic dispersion in step S1809, the control unit 137 may determine whether the BER output from the optical receiver 132 increases. If the BER output from the optical receiver 132 does not increase, the process returns to step S1806 and then continues. If the BER output from the optical receiver 132 increases, error processing is performed.

For example, the control unit 137 completes the dispersion-compensating operation by outputting an error message to the user or the host system. Therefore, it is possible to avoid continuous false calculation of variation in chromatic dispersion when the correspondence relationship between the compensation amount of chromatic dispersion to the optical signal and the communication quality of the optical signal varies with the passage of time or the like. Thus, the communication quality can be prevented from decreasing due to control of the compensation amount of the TODC 134 in the false direction.

In addition, as error processing, the control unit 137 may recreate the correspondence information by returning to step S1805 and performing the preliminary operation again. Therefore, even if the correspondence relationship between the compensation amount of chromatic dispersion to the optical signal and the communication quality of the optical signal varies with the passage of time or the like, the variation in chromatic dispersion can be correctly calculated again based on the recreated correspondence information. Therefore, the dispersion-compensating operation can be continued.

As described above, the dispersion compensation device 131 of the fifth embodiment exerts advantageous effects of the dispersion compensation device 131 of the first embodiment, while including the storage unit 1711 storing the relationship between the compensation amount of chromatic dispersion to an optical signal and the communication quality of the optical signal. Then, the control unit 137 calculates the variation in amount of chromatic dispersion of the optical signal based on both the communication quality monitored by the supervisory optical receiver 136 and the correspondence information stored in the storage unit 1711.

In addition, the control unit 137 controls the compensation amount of the TODC 134 based on the calculated variation. Therefore, the compensation amount of the TODC 134 can be adjusted to near the optimal compensation amount c21. Thus, the time period desired for lowering the BER of the optical axis to be received by the optical receiver 132 can be shortened. Therefore, the dispersion compensation control can be performed quickly, without decreasing the communication quality.

Here, the description has been made such that, as preliminary operation, the control unit 137 prepares correspondence information by acquiring the BER b51 from the supervisory optical receiver 136 while changing the compensation amount of the supervisory TODC 501. However, the method for preparing correspondence information is not limited to one described above. Alternatively, for example, as preliminary operation, the control unit 137 may prepare correspondence information by acquiring BER from the optical receiver 132 by changing the compensation amount of the TODC 134. In this case, the supervisory fixed DC 135 may be installed in replacement of the supervisory TODC 501 (see FIG. 1).

Sixth Embodiment

Figure 19:
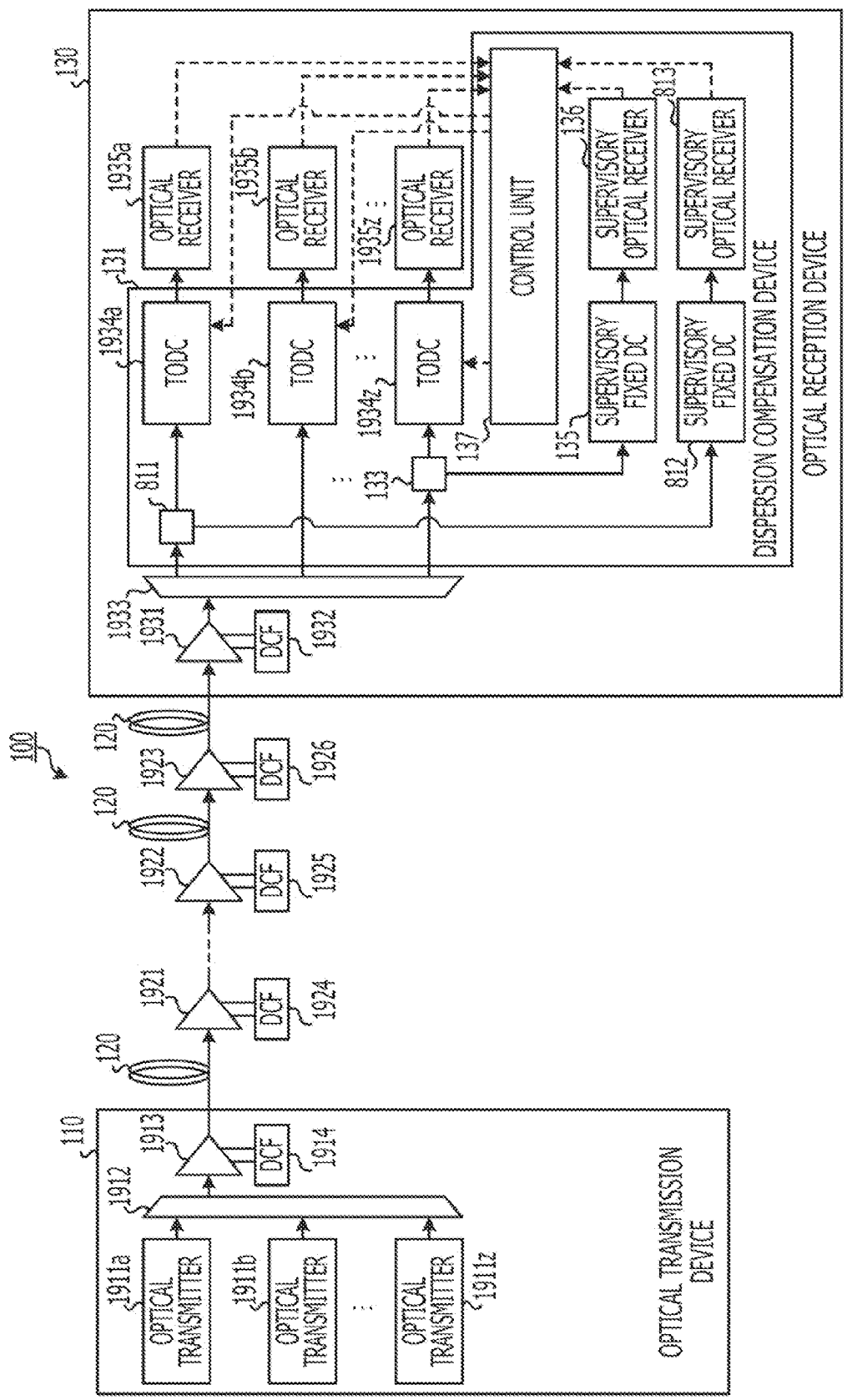
FIG. 19 is a block diagram illustrating the functional configuration of an optical transmission system according to a sixth embodiment.

FIG. 19 is a block diagram illustrating the functional configuration of an optical transmission system according to a sixth embodiment. In FIG. 19, components already described with reference to FIG. 8 are denoted by the same reference numerals, and thus detailed description thereof will be hereinafter omitted. As shown in FIG. 19, an optical transmission system 100 according to the sixth embodiment is an example where the optical transmission system 100 shown in FIG. 8 is applied to the WDM transmission system.

The optical transmission device 110 includes optical transmitters 1911a to 1911z, a wavelength multiplexing unit 1912, an optical amplifier 1913, and a DCF 1914. Each of the optical transmitters 1911a to 1911z is the same configuration as the optical transmitter 111 shown in FIG. 8. The optical transmitters 1911a to 1911z output optical signals with wavelengths (a to z) which are different from one another to the wavelength multiplexing unit 1912.

The wavelength multiplexing unit 1912 carries out wavelength multiplexing on each optical signal output from each of the optical transmitters 1911a to 1911z, and then outputs the multiplexed optical signal to the optical amplifier 1913. The optical amplifier 1913 amplifies the optical signal output from the wavelength multiplexing unit 1912 and then transmits the amplified optical signal to an optical reception device 130. The DCF 1914 performs dispersion compensation on the optical signal passing through the optical amplifier 1913 using a fixed amount of chromatic dispersion.

In a transmission line 120, the optical amplifiers 1921 to 1923 that amplify optical signals passing through the transmission line 120 are arranged at a predetermined distance from one another. In addition, the optical amplifiers 1921 to 1923 are provided with DCFs 1924 to 1926, respectively. The DCFs 1924 to 1926 perform dispersion compensation on the optical signals passing through the optical amplifiers 1921 to 1923 using a fixed amount of chromatic dispersion, respectively.

The optical reception device 130 includes an optical amplifier 1931, a DCF 1932, a wavelength-multiplexing separating unit 1933, a dispersion compensation device 131, and optical receivers 1935a to 1935z. The optical amplifier 1931 amplifies the optical signal transmitted from the optical transmission device 110 through the transmission line 120 and then outputs the amplified optical signal to the wavelength-multiplexing separating unit 1933.

The DCF 1932 performs dispersion compensation on the optical signal passing through the optical amplifier 1931 using a fixed amount of chromatic dispersion. The wavelength-multiplexing separating unit 1933 carries out wavelength-multiplexing separation of the optical signals output from the optical amplifier 1931 into the respective optical signals with wavelengths different from one another. The wavelength-multiplexing separating unit 1933 outputs optical signals (wavelength a to z) subjected to the wavelength-multiplexing separation to TODCs 1934a to 1934z, respectively.

Each of the TODCs 1934a to 1934z is the same configuration as the TODC 134 shown in FIG. 8. Each of the TODCs 1934a to 1934z performs dispersion compensation on the optical signals output from the wavelength-multiplexing separating unit 1933. The TODCs 1934a to 1934z output the dispersion-compensated optical signals to the optical receivers 1935a to 1935z, respectively. The compensation amount of chromatic dispersion by each of the TODCs 1934a to 1934z is controlled by the control unit 137.

Each of the optical receivers 1935a to 1935z is the same configuration as the optical receiver 132 shown in FIG. 8. The optical receivers 1935a to 1935z receive the optical signals output from the TODC 1934a to 1934z, respectively. Each of the optical receivers 1935a to 1935z calculates the BER of the received optical signals and then outputs the calculated BER to the control unit 137, respectively.

The optical coupler 133 branches and outputs the optical signal, which is output from the wavelength-multiplexing separating unit 1933 to the TODC 1934z, to the supervisory fixed DC 135. The optical coupler 811 branches and outputs the optical signal, which is output from the wavelength-multiplexing separating unit 1933 to the TODC 1934a, to the supervisory fixed DC 812. In this way, each of the optical couplers 133 and the optical couplers 811 can branch any of optical signals subjected to wavelength-multiplexing separation by the wavelength-multiplexing separating unit 1933.

The control unit 137 individually controls the compensation amount of each of the TODCs 1934a to 1934z output from the supervisory optical receiver 136 and the supervisory optical receiver 813, respectively. In addition, the control unit 137 controls the above respective compensation amounts so that the residual amount of chromatic dispersion of each optical signal (actual signal) received by each of the optical receivers 1935a to 1935z can be the minimum or less than a threshold e.g., a predetermined amount.

Specifically, the control unit 137 performs each step shown in FIG. 10 on a pair of the TODC 1934a and the optical receiver 1935a. Similarly, the control unit 137 performs the respective steps shown in FIG. 10 on a pair of the TODC 1934b and the optical receptor 1935b, . . . , and a set of the TODC 1934z and the optical receiver 1935z in parallel, respectively.

Here, different optical signals (here, at wavelength a and wavelength z) among the optical signals subjected to wavelength-multiplexing separation by the wavelength-multiplexing separating unit 1933 may be branched by the optical coupler 133 and the optical coupler 811, respectively. Therefore, the supervisory optical receiver 136 and the supervisory optical receiver 813 can monitor the BERs of the respective optical signals at different wavelength ranges.

In addition, even if one of the respective optical signals at wavelengths a and z is not used, the BER of the optical signal used is placed under observation to continue the dispersion compensation control. In this case, the control unit 137 acquires the BER corresponding to the optical signal among the BERs output from the supervisory optical receiver 136 and the supervisory optical receiver 813. Then, for example, the control unit 137 performs the respective steps shown in FIG. 3 based on the acquired BER.

Figure 20:
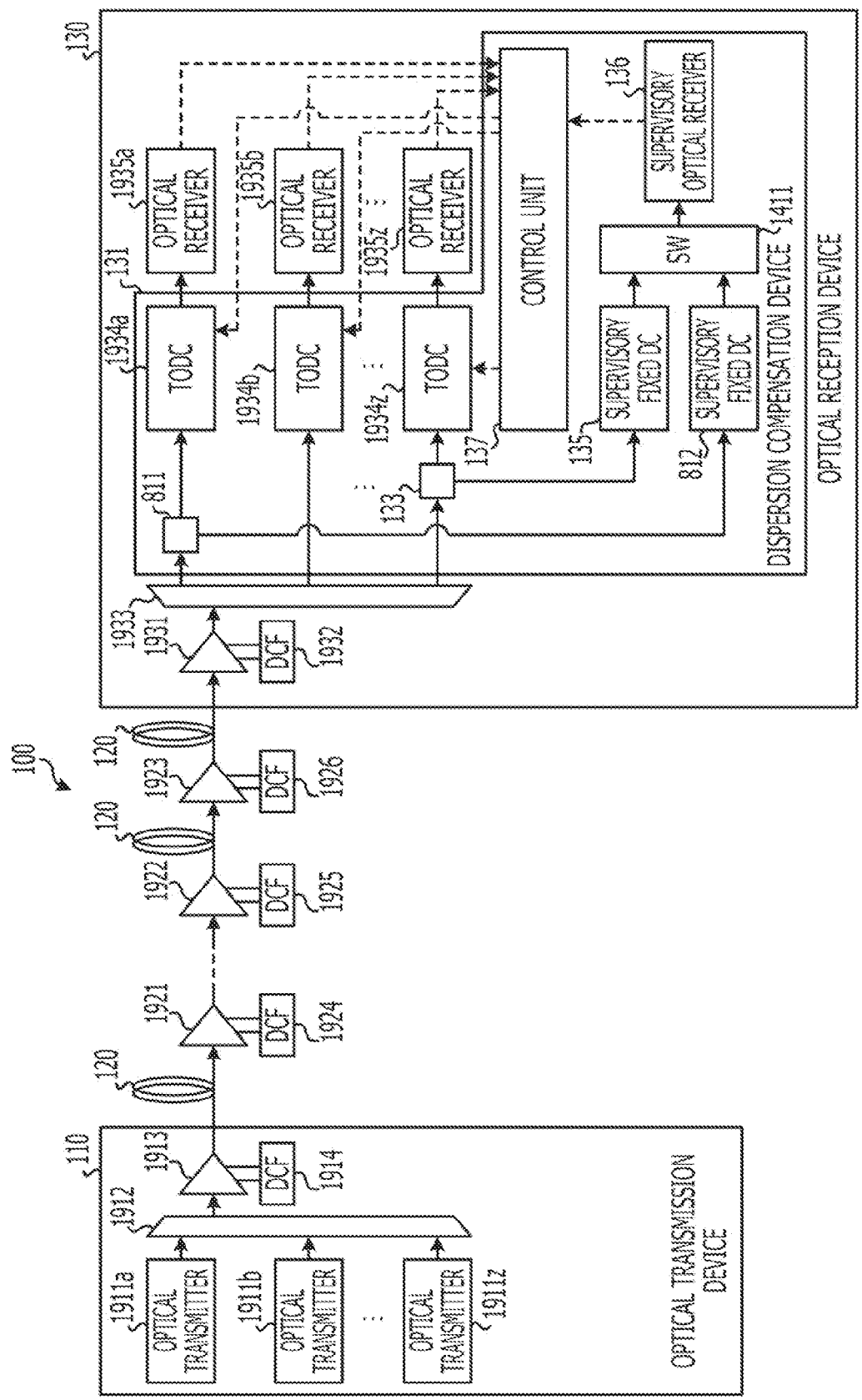
FIG. 20 is a block diagram illustrating a modified example of the optical transmission system illustrated in FIG. 19.

FIG. 20 is a diagram illustrating a modified example of the optical transmission system shown in FIG. 19. In FIG. 20, components already described with reference to FIG. 14 or FIG. 19 are denoted by the same reference numerals, and thus detailed description thereof will be hereinafter omitted. As shown in FIG. 20, an optical transmission system 100 of the sixth embodiment may be designed such that the optical transmission system 100 shown in FIG. 14 is applied to the WDM transmission system.

Specifically, the optical transmission system 100 may include an optical switch 1411 (see FIG. 14) instead of the supervisory optical receiver 813 shown in FIG. 19. The control unit 137 performs the respective steps shown in FIG. 10 on a pair of the TODC 1934a and the optical receptor 1935a, . . . , and a set of the TODC 1934z and the optical receiver 1935z in parallel, respectively.

Figure 21:
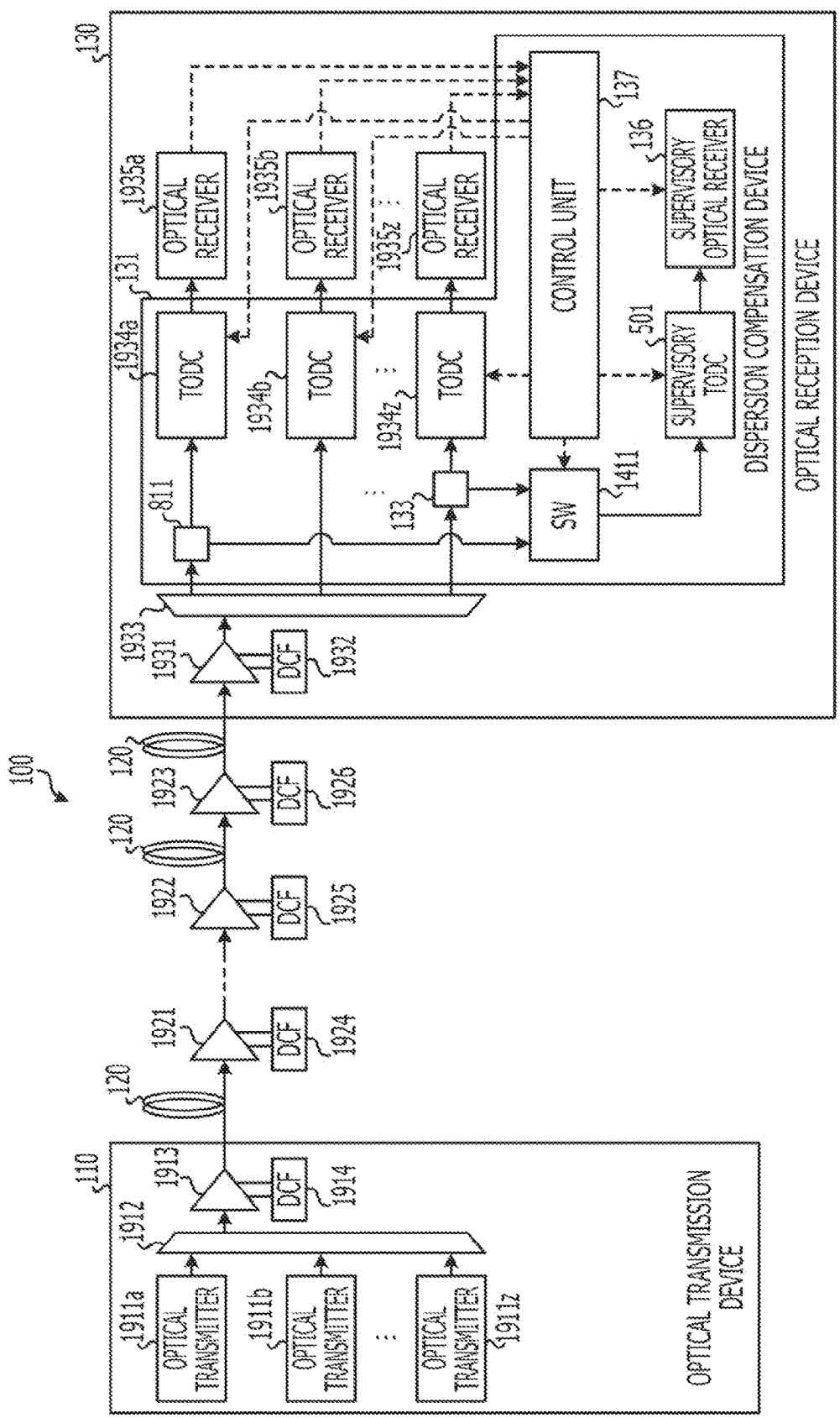
FIG. 21 is a block diagram illustrating a modified example of the optical transmission system illustrated in FIG. 20.

FIG. 21 is a diagram illustrating a modified example of the optical transmission system shown in FIG. 20. In FIG. 21, components already described with reference to FIG. 20 are denoted by the same reference numerals, and thus detailed description thereof will be hereinafter omitted. In the configuration shown in FIG. 21, alternatively, the supervisory TODC 501 (see FIG. 5) may be installed in place of both the supervisory fixed DC 135 and the supervisory fixed DC 812. In this case, the optical switch 1411 is formed on the upstream of the supervisory TODC 501.

Each of the optical coupler 133 and the optical coupler 811 outputs the branched optical signal to the optical switch 1411. Under control of the control unit 137, the optical switch 1411 outputs one of optical signals output from the optical coupler 133 and the optical coupler 811 to the supervisory TODC 501. The supervisory TODC 501 performs dispersion compensation on the optical signal output from the optical switch 1411 with a variable compensation amount and then outputs the dispersion-compensated optical signal to the supervisory optical receiver 136.

The control unit 137 controls the optical switch 1411 to output the optical signal generated from the optical coupler 133 when the BER of the optical signal subjected to dispersion compensation with the above insufficient compensation amount, while controlling the compensation amount of the supervisory TODC 501 to an insufficient compensation amount. In addition, the control unit 137 controls the optical switch 1411 to output the optical signal generated from the optical coupler 811 when the BER of the optical signal subjected to dispersion compensation with the above excessive compensation amount, while controlling the compensation amount of the supervisory TODC 501 to an excessive compensation amount.

In this way, in the dispersion compensation device 131 of the sixth embodiment, the direction of variation in communication quality to be observed varies depending on the direction of variation in chromatic dispersion of the optical signal. For this reason, the dispersion compensation control can be performed quickly, without controlling the compensation amount of each of the TODCs 1934a to 1934z at high speed in the suitable direction, while preventing the communication quality from decreasing.

Here, different optical signals among the optical signals subjected to wavelength-multiplexing separation by the wavelength-multiplexing separating unit 1933 are branched by the optical coupler 133 and the optical coupler 811, respectively. In addition, even if one of the respective optical signals at wavelengths being branched is not used, the BER of the optical signal used is placed under monitoring to continue the dispersion compensation control.

Seventh Embodiment

Figure 22:
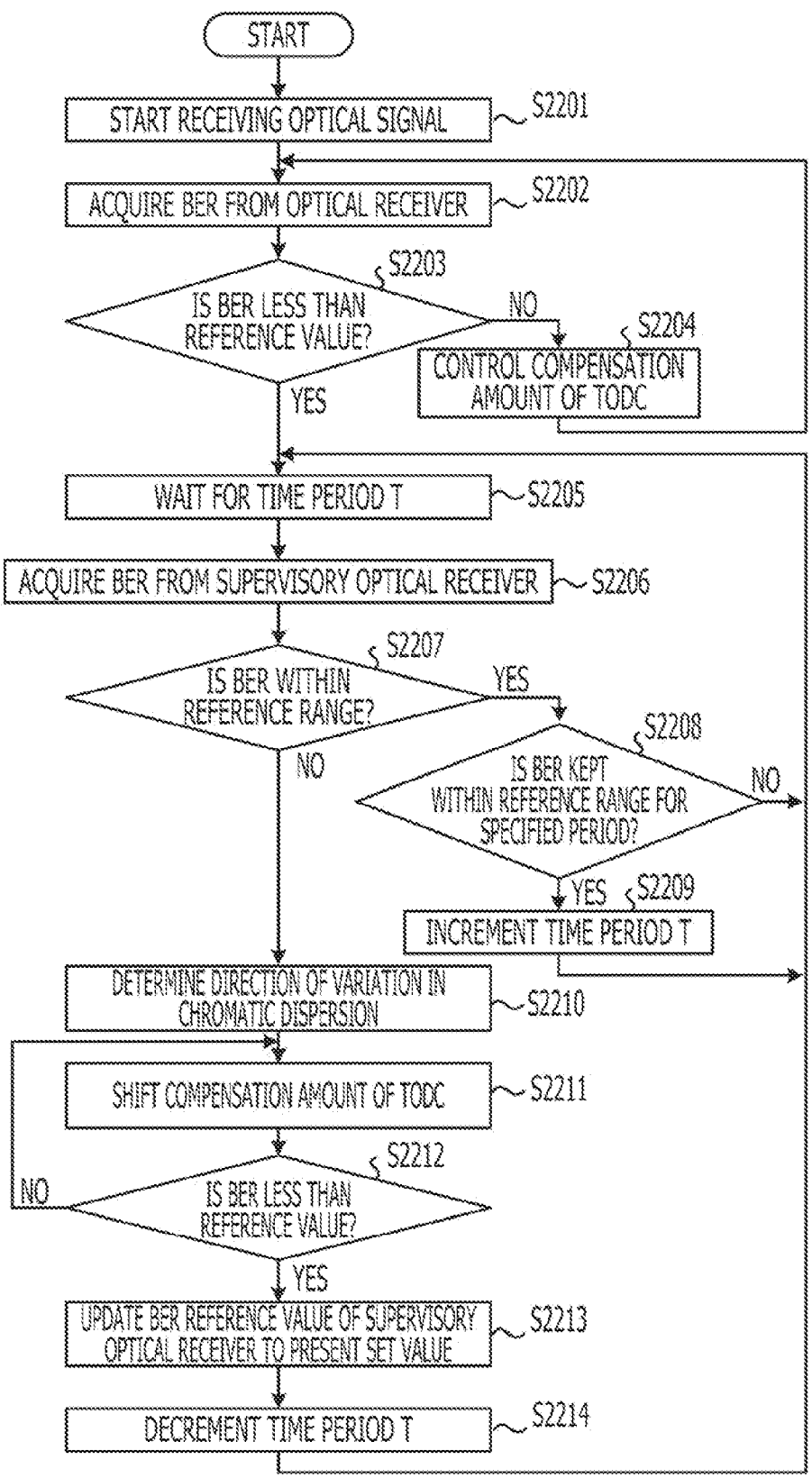
FIG. 22 is a flow chart illustrating an example of the operation of a dispersion compensation device according to a seventh embodiment.

FIG. 22 is a flow chart representing an exemplary operation of a dispersion compensation device of the seventh embodiment. A dispersion compensation device 131 of the seventh embodiment can reduce the control amount of a TODC 134 by extending the control cycle of the compensation amount of the TODC 134 when BER b51 from the supervisory optical receiver 136 does not vary over a specified time or more and over a specified amount or more. The dispersion compensation device 131 according to the seventh embodiment has the same configuration as that of the dispersion compensation device 131 shown in FIG. 1.

Steps S2201 to S2204 shown in FIG. 22 are the same as the steps S301 to S304 shown in FIG. 3, so that the descriptions thereof will be omitted. In step S2203, if the BER is less than the reference value b42 (Step S2203: YES), the control unit 137 enters into a standby mode for a specified period of time T (step S2205). The period T in step S2205 is provided for adjusting the control cycle of the compensation amount of TODC 134.

Steps S2206 to S2207 shown in FIG. 22 are the same as the steps S305 to S310 shown in FIG. 3, so that the descriptions thereof will be omitted. In step S2207, if the BER b51 is within the reference range b52 (step S2207: Yes), the control unit 137 determines whether the BER b51 is continuously kept within the reference range b52 for a specified period of time in step S2207 (step S2208). If the BER b51 is continuously out of the reference range b52 for a specified period of time (step S2208: NO), then the process returns to step S2205 and then continues.

In step S2208, if the BER b51 is continuously kept within the reference range b52 for a specified period of time in step S2208 (step S2208: YES), the control unit 137 allows the time period T to be increased with a specified additional time (step S2209). Subsequently, the process returns to step S2205 and then continues. Therefore, while the BER b51 is continuously kept within the reference range b52 more than a specified period of time or more, the period T continuously increases.

Steps S2210 to S2213 are similar to the steps S307 to S310 shown in FIG. 3. In Step S2208, the BER b51 is continuously kept within the reference range b52 for a specified period of time or more. In addition it may be determined whether an increase in period T by step S2209 is continuously avoided for a specified period of time or more. In this case, if the BER b51 is continually kept within the specified range b52 or more or the time period T is continuously kept in constant for a specified period of time or more, the process returns to step S2205 and then continues.

In addition, if the BER b51 is continuously kept within the reference range b52 for a period of time or more and the time period T is continuously kept in constant for a specified period of time or more, then the process proceeds to step S2209. Subsequently, after an increase in time period T in step S2209, a further increase in time period T is avoided until the BER b51 is continuously kept within the specified range b52 for a specified period of time.

In step S2214, furthermore, the time period T may be initialized instead of decreasing the time period T for a specified time to reset the time period T increased by step S2209 to the initial time. Therefore, the control cycle of the compensation amount of the TODC 134 can be quickly shortened when the BER b51 is out of the reference range b52 (i.e., when the amount of chromatic dispersion is changed).

In this way, the dispersion compensation device 131 of the seventh embodiment can extend the control cycle of the compensation amount of the TODC 134 when the BER b51 of the optical signal monitored by the supervisory optical receiver 136 is a specified period of time or more and kept within a specified range. Therefore, the effects of the dispersion compensation device 131 of the first embodiment can be exerted. In addition, the control amount of the TODC 134 under control of the control unit 137 can be reduced when the amount of chromatic dispersion of the optical signal is constant because of stable optical transmission.

If the BER b51 is shifted out of the reference range b52 and the compensation amount of the TODC 134 is then changed, the control cycle of the compensation amount of the TODC 134 can be shortened by reducing the time period T. Therefore, when the amount of chromatic dispersion of an optical signal varies as a result of unstable optical transmission, the compensation amount of the TODC 134 can be promptly controlled with high accuracy.

In addition, the control unit 137 may control the cycle of calculating the BER b51 (period of monitoring the communication quality) by the supervisory optical receiver 136. In step S2209, for example, the control unit 137 may prolong the cycle of calculating the BER b51 by the supervisory optical receiver 136. Therefore, if the amount of chromatic dispersion of an optical signal is kept constant because of stable optical transmission, the monitoring load of the supervisory optical receiver 136 (calculation burden of the BER b51) can be reduced.

In addition, if the BER b51 is out of the reference range b52 and the compensation amount of the TODC 134 is changed, the cycle of calculating the BER b51 by the supervisory optical receiver 136 can be shortened. Therefore, if the amount of chromatic dispersion of the optical signal is changed because of unstable optical transmission, a change in BER b51 can be quickly monitored with high accuracy and the compensation amount of the TODC 134 can be quickly controlled with high accuracy.

Eighth Embodiment

Figure 23:
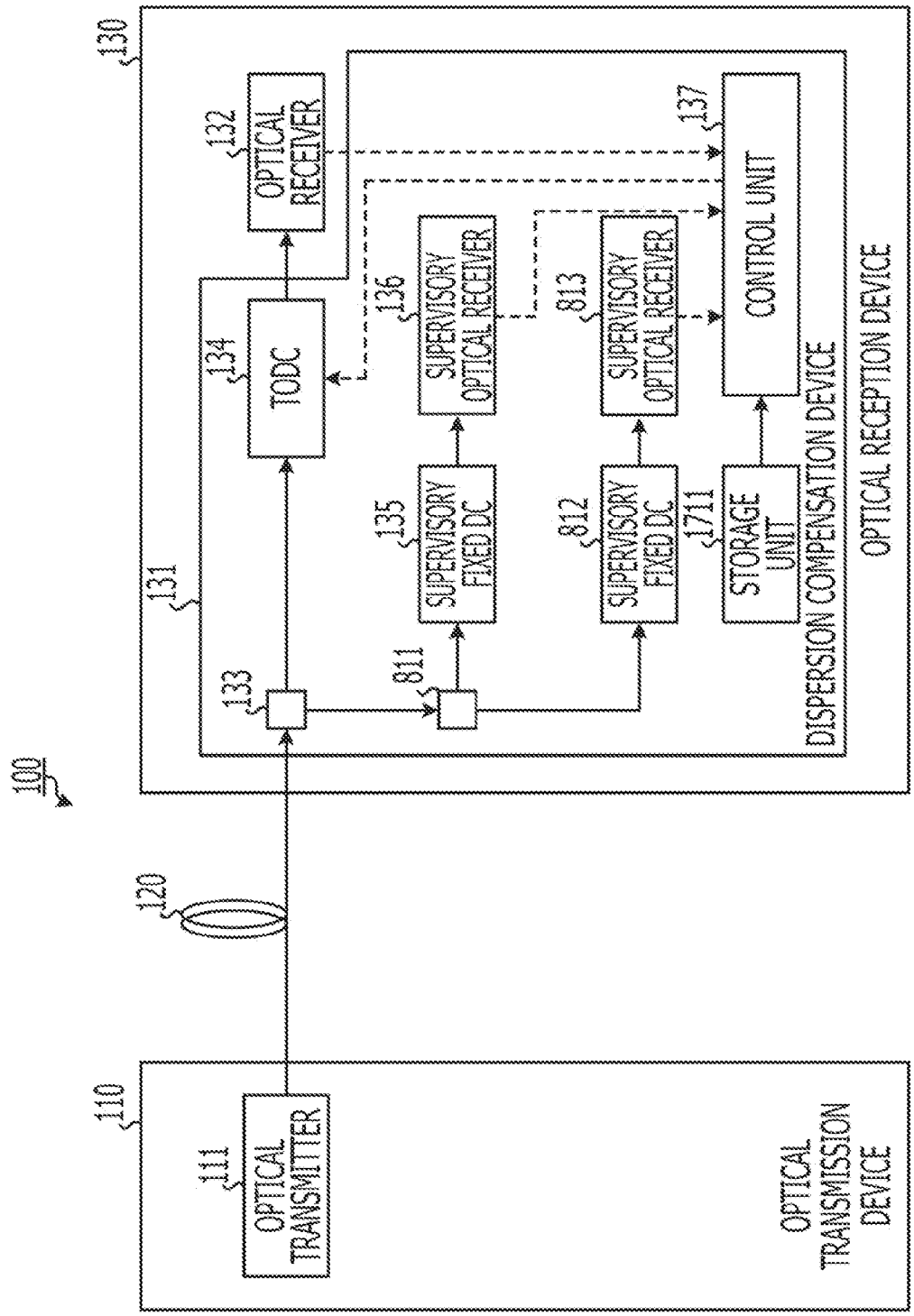
FIG. 23 is a block diagram illustrating the functional configuration of an optical transmission system according to an eighth embodiment.

FIG. 23 is a block diagram illustrating the functional configuration of an optical transmission system according to an eighth embodiment. In FIG. 23, components already described with reference to FIG. 8 are denoted by the same reference numerals, and thus detailed description thereof will be hereinafter omitted. The configuration of the eighth embodiment is a combination of the third embodiment and the fifth embodiment. As shown in FIG. 23, the dispersion compensation device 131 of the eighth embodiment includes a storage unit 1711 (see FIG. 17) in addition to the structural components shown in FIG. 8.

In the dispersion compensation control based on the BER from each of the supervisory optical receiver 136 and the supervisory optical receiver 813, the control unit 137 calculates the variation in dispersion of the optical signal based on the BER from the supervisory optical receiver 132 and the correspondence information stored in the storage unit 1711. The control unit 137 changes the compensation amount of the TODC 134 as much as an amount corresponding to the calculated variation in dispersion.

The corresponding information is stored in the storage unit 1711 before the dispersion compensation control based on the BER from each of the supervisory optical receiver 136 and the supervisory optical receiver 813. For example, as preliminary operation, the control unit 137 prepares correspondence information by acquiring the BER from the optical receiver 132 while changing the compensation amount of the TODC 134 before the dispersion compensation control based on each BER. Then, the control unit 137 stores the prepared correspondence information in the storage unit 1711.

Figure 24:
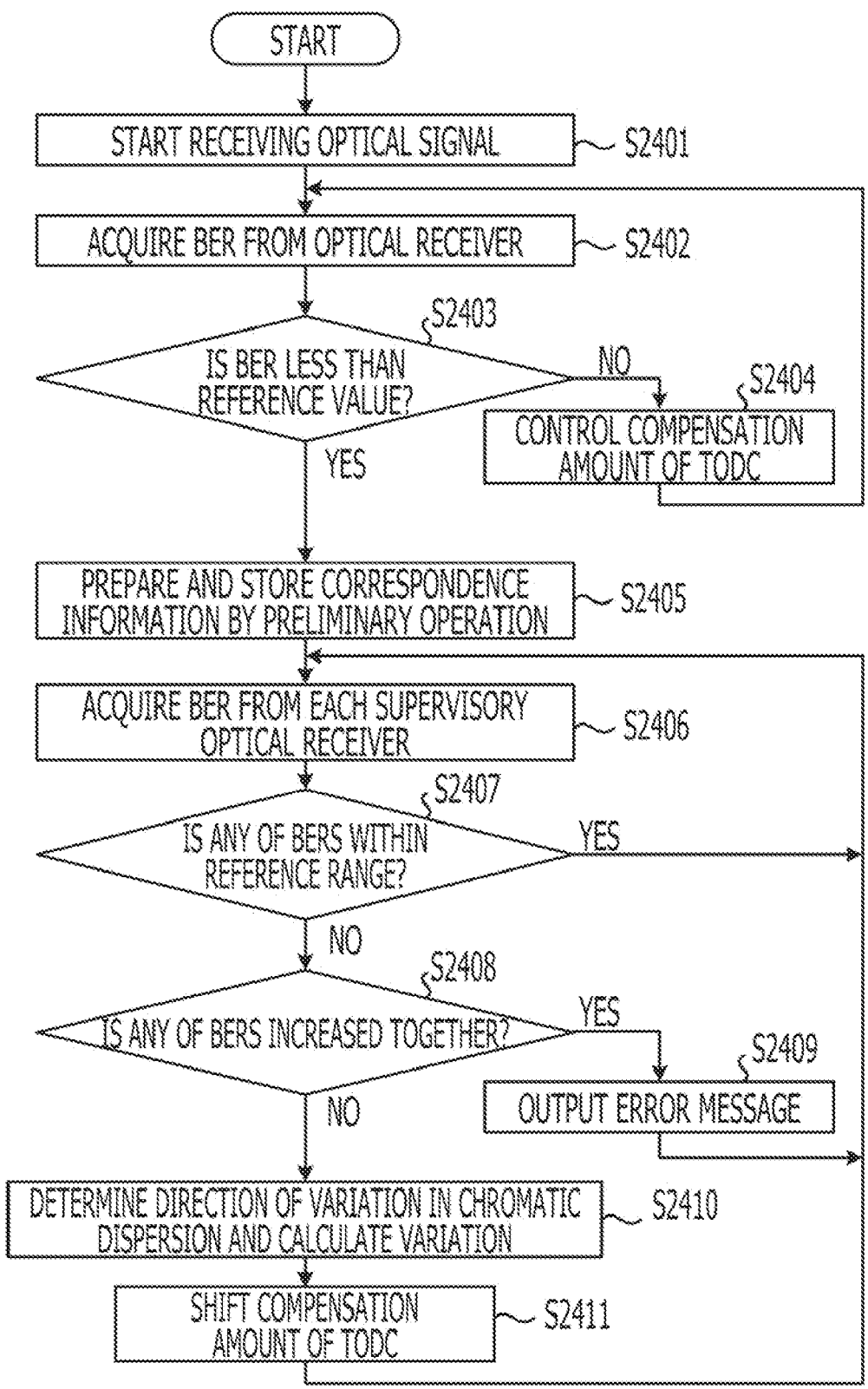
FIG. 24 is a flow chart illustrating an example of the operation of a control unit illustrated in FIG. 23.

FIG. 24 is a flow chart representing an example of the operation of the control unit shown in FIG. 23. Steps S2401 to S2404 shown in FIG. 24 are the same as the steps S301 to S304 shown in FIG. 3, so that the descriptions thereof will be omitted. In step S2403, if BER is less than the reference value b42 (step S2403: YES), the control unit 137 prepares correspondence information by performing the aforementioned preliminary operation and then stores the prepared correspondence information in the storage unit 1711 (step S2405).

Steps S2406 to S2409 are the same as the steps S1005 to S1008 shown in FIG. 10, so that the descriptions thereof will be omitted. Subsequently, the case of no increase in any of BERs in step S2408 will be described. In this case, the control unit 137 determines the direction of variation in chromatic dispersion of an optical signal based on each BER and the correspondence information stored in step S2405 and then calculates the variation in chromatic dispersion of the optical signal (step S2410).

Next, the control unit 137 changes the compensation amount of the TODC 134 as much as the calculated variation in the direction corresponding to the variation direction determined in step S2410 (step S2411). Then, the process returns to step S2406 and continues. By repeating steps S2406 to S2411, even if the amount of chromatic dispersion of the optical signal input into the dispersion compensation device 131 changes with change with the passage of time, the BER of the optical signal received by the optical receiver 132 is substantially always controllable within the reference range.

Next, the case where one of the BER b51 and BER d93 is within the reference range b52, and the other thereof is out of the reference range b52 in step S2410 (see FIG. 12) will be described. In this case, the control unit 137 temporary determines the direction of variation in chromatic dispersion of an optical signal based on a change in BER b51 and correspondence information. Furthermore, the control unit 137 temporary determines the direction of variation in chromatic dispersion of an optical signal based on a change in BER d93 and correspondence information.

Furthermore, if the result of the temporary determination of the direction of variation in BER b51 is coincident with the result of the temporary determination of the direction of variation in BER d93, the control unit 137 determines the variation direction of the temporary result as the variation direction of chromatic dispersion. On the other hand, if the result of the temporary determination of the direction of variation in BER b51 is not coincident with the result of the temporary determination of the direction of variation in BER d93, the controller unit 137 performs error processing. For example, the control unit 137 completes the dispersion-compensating operation by outputting an error message to the user or the host system.

In this way, the dispersion compensator 131 of the eighth embodiment temporary determines the direction of variation in chromatic dispersion based on the direction of variation in BER b51 and also temporary determines the direction of variation in chromatic dispersion based on the direction of variation in BER d93. Then, the direction of variation in chromatic dispersion can be more positively determined by determining the compatibility of each temporary determination result. Therefore, the compensation amount of TODC 134 can be controlled more precisely. Besides, the dispersion compensation control can be performed quickly, without decreasing the communication quality.

Here, the description has been made such that, as preliminary operation, the control unit 137 prepares correspondence information by acquiring the BER from the optical receiver 132 while changing the compensation amount of the TODC 134. However, the method for preparing correspondence information is not limited to one described above. For example, the supervisory fixed TODC 501 (see FIG. 5) may be installed in place of the supervisory fixed DC 135. For example, the control unit 137 may create correspondence information by acquiring BER from the supervisory optical receiver 136, while changing the compensation amount of the supervisory TODC 501.

Alternatively, the supervisory TODC 501 may be installed in place of the supervisory fixed DC 812. For example, the control unit 137 may create correspondence information by acquiring BER from the supervisory optical receiver 813, while changing the compensation amount of the supervisory TODC 501. Furthermore, the optical transmission system 100 may include an optical switch 1411 (see FIG. 14) instead of the supervisory optical receiver 813.

As described above, the present embodiment permits monitoring of the communication quality of the optical signal subjected to dispersion compensation with the excessive or insufficient compensation amount compared with the optimal amount of dispersion compression. Thus, the direction of variation in communication quality under monitoring varies depending on the direction of variation in chromatic dispersion of an optical signal. Therefore, a direction of variation in chromatic dispersion can be determined, and the compensation amount in variable dispersion compensation can be controlled in the suitable direction. Therefore, the dispersion compensation control can be performed quickly, without decreasing the communication quality.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A dispersion compensation device, comprising:
   an optical branching unit to branch an optical signal to be received;
   a first dispersion compensator to perform dispersion compensation on one part of the optical signal branched by the optical branching unit with a variable compensation amount;
   a second dispersion compensator to perform dispersion compensation on another part of the optical signal branched by the optical branching unit;
   a monitoring unit to monitor the communication quality of an output optical signal of the second dispersion compensator; and
   a controlling unit to determine the direction of variation in chromatic dispersion of the optical signal based on the direction of variation in communication quality monitored by the monitoring unit and control the compensation amount of the first dispersion compensator based on the result of the determination.

2. The dispersion compensation device according to claim 1, wherein
   the second dispersion compensator has a dispersion compensation amount by which a value representing a decrease in communication quality of the output optical signal is equal to or greater than a specified value.

3. The dispersion compensation device according to claim 1, wherein
   the second dispersion compensator performs dispersion compensation on an optical signal with a compensation amount that is variable.

4. The dispersion compensation device according to claim 3, wherein
   the controlling unit to control the compensation amount of the second dispersion compensator to a compensation amount insufficient or excessive to the amount of chromatic dispersion of the optical signal.

5. The dispersion compensation device according to claim 3, wherein
   the controlling unit controls the compensation amount of the second dispersion compensator so that a first compensation amount insufficient to the amount of chromatic dispersion of the optical signal and a second compensation amount insufficient to the amount of chromatic dispersion of the optical signal are alternately switched;
   the monitoring unit monitors each communication quality of each optical signal subjected to dispersion compensation with the first compensation amount and the second compensation amount by the second compensator; and
   the controlling unit determines the direction of variation in the chromatic dispersion based on the direction of variation in each communication quality.

6. The dispersion compensation device according to claim 1, further comprising:
   a second optical branching unit to branch the optical signal from the optical branching unit, which is arranged between the optical branching unit and the second dispersion compensator; and
   a third dispersion compensator to perform dispersion-compensation on the optical signal branched by the second optical branching unit, wherein
   the third dispersion compensator has a dispersion compensation amount by which the communication quality of the output optical signal is equal to or greater than a specified value and a variation in value representing the communication quality with respect to a variation in chromatic dispersion has an inverse characteristic with respect to the dispersion compensation amount of the second dispersion compensator;
   the monitoring unit monitors the communication quality of each optical signal subjected to dispersion compensation by the second dispersion compensator and the third dispersion compensator, and
   the controlling unit determines the direction of variation in the chromatic dispersion based on the direction of variation in value of the communication quality of the each optical signal.

7. The dispersion compensation device according to claim 6, further comprising:
   an optical switch to output one of the respective optical signals subjected to dispersion compensation by the second dispersion compensator and the third dispersion compensator, wherein
   the controlling unit controls the optical switch so that the optical switch alternately switches optical signals to be output from the optical switch among the respective optical signals,
   the monitoring unit monitors the communication quality of each optical signal output from the optical switch, and
   the controlling unit determines the direction of variation in the amount of chromatic dispersion based on the direction of variation in communication quality of each optical signal monitored by the monitoring unit.

8. The dispersion compensation device according to claim 1, further comprising:
   a storing unit to store information about correspondence between the compensation amount of chromatic dispersion to an optical signal and the communication quality of the optical signal, wherein
   the controlling unit calculates the variation in amount of chromatic dispersion of the optical signal based on both the communication quality observed by the monitoring unit and the correspondence information stored in the storing unit, and controls the compensation amount of the first dispersion compensator based on the calculated variation.

9. The dispersion compensation device according to claim 1, wherein
   the controlling unit extends the control cycle of the compensation amount when the communication quality of the optical signal monitored by the monitoring unit is equal to or more than a specified period of time.

10. The dispersion compensation device according to claim 1, wherein
    the controlling unit extends the monitoring cycle of the communication quality when the communication quality of the optical signal monitored by the monitoring unit is equal to or more that a specified period of time.

11. An optical receiving device, comprising:

an optical branching unit to branch an optical signal;

a first dispersion compensator to perform dispersion compensation on one part of the optical signal branched by the optical branching unit with a compensation amount that is variable;

a second dispersion compensator to perform dispersion compensation on another part of the optical signal branched by the optical branching unit;

a monitoring unit to monitor the communication quality of an output optical signal of the second dispersion compensator;

a controlling unit to determine the direction of variation in chromatic dispersion of the optical signal based on the direction of variation in communication quality monitored by the monitoring unit and to control the compensation amount of the first dispersion compensator based on the result of the determination by the determining unit; and an optical receiver to receive the optical signal subjected to dispersion compensation by the first dispersion compensator.

12. A method for chromatic dispersion compensation, comprising:

branching an optical signal;

performing dispersion compensation on one part of the branched optical signal by a variable dispersion compensator;

performing dispersion compensation on the other part of the branched optical signal;

monitoring the communication quality of an output optical signal obtained by dispersion compensation on the other part of the branched optical signal;

determining the direction of variation in chromatic dispersion of the optical signal based on the direction of variation in communication quality monitored by the means for monitoring; and controlling the compensation amount of the one part of the branched optical signal based on the determination result.

* * * * *